(12) United States Patent
Wilson et al.

(10) Patent No.: US 11,984,610 B1
(45) Date of Patent: May 14, 2024

(54) BATTERY PACK

(71) Applicant: Rivian IP Holdings, LLC, Plymouth, MI (US)

(72) Inventors: Jonathan Christopher Wilson, Rancho Mission Viejo, CA (US); Kyle Butterfield, Ladera Ranch, CA (US); Yann Marie Philippe Pissonnier, Irvine, CA (US); Leon Decordiva Brown, Woolwich (GB)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/147,303

(22) Filed: Dec. 28, 2022

(51) Int. Cl.
| | |
|---|---|
| *H01M 50/204* | (2021.01) |
| *B60L 50/64* | (2019.01) |
| *H01M 10/653* | (2014.01) |
| *H01M 10/6557* | (2014.01) |
| *H01M 50/244* | (2021.01) |

(52) U.S. Cl.
CPC .......... *H01M 50/204* (2021.01); *B60L 50/64* (2019.02); *H01M 10/653* (2015.04); *H01M 10/6557* (2015.04); *H01M 50/244* (2021.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 2013/0220716 A1* | 8/2013 | Favaretto | ................ | B60K 1/04 |
| | | | | 903/903 |
| 2019/0081309 A1* | 3/2019 | Capati | ................ | H01M 50/213 |
| 2021/0094441 A1* | 4/2021 | Sampson | ................ | B60K 1/02 |

* cited by examiner

*Primary Examiner* — Wyatt P McConnell
(74) *Attorney, Agent, or Firm* — Foley & Lardner LLP

(57) ABSTRACT

A battery pack can include a bay having a first bay wall and a second bay wall. The battery pack can include a battery cell having a top portion and a bottom portion. The top portion of the battery cell can face the first bay wall of the bay and the bottom portion of the battery cell can face a second bay wall of the bay.

15 Claims, 18 Drawing Sheets

BATTERY PACK

INTRODUCTION

Battery packs can be used to provide power to electric vehicles.

SUMMARY

Battery packs can occupy large amounts of space in electric vehicles, and the size of a battery pack can be dictated by the size of the battery cells provided within the battery pack. With limited battery cell options, battery pack sizes and incremental size adjustments of the battery packs are limited. The technical solution described herein provides a battery pack with a battery cell arrangement that includes battery cells being oriented horizontally within the battery pack. The horizontal orientation of the battery cells allows for a height of the battery pack to be reduced and adjusted/designed more flexibly, by smaller increments.

At least one aspect is directed to a battery pack. The battery pack can include a bay that has a first wall and a second wall. The battery pack can include a battery cell that has a top portion and a bottom portion. The top portion of the battery cell can face the first wall of the bay. The bottom portion of the battery cell can face a second wall of the bay.

At least one aspect is directed to a method. The method can include disposing a battery cell in a bay of a battery pack. The bay can include a first wall and a second wall. The battery cell can include a top portion and a bottom portion. The method can include orienting the battery cell in the bay such that the top portion faces the first wall and the bottom portion faces the second wall.

At least one aspect is directed to an electric vehicle. The electric vehicle can include a battery pack. The battery pack can include a structural member disposed between the first wall and the second wall. The structural member can extend along the battery pack parallel with at least a portion of the first wall and at least a portion of the second wall. The battery pack can include a battery cell that has a top portion and a bottom portion. The least one of the top portion and the bottom portion of the battery cell can be disposed adjacent to the structural member.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of a battery pack. The various concepts introduced above and discussed in greater detail below may be implemented in any of numerous ways.

The present disclosure is directed to systems and methods for providing a battery pack that has battery cells disposed horizontally within the battery pack. The disclosed solutions can have a technical advantage of creating battery packs with a shorter height to save vertical room in vehicles. The disclosed solutions can have the technical advantage of reducing the number of components within a battery pack by using components for multiples purposes. For example, a structural member can retain the battery cells in a desired positon, provide strength and load resistance to the battery pack, and provide thermal management (e.g., cooling) to the battery pack. The disclose solutions can have the technical advantage of reducing the load that is transferred to the battery cells of the battery pack by absorbing more of the load in the structural members and distributing the load throughout the battery pack. For example, the disclosed solutions can provide longer and narrower battery cell assemblies, and therefore, longer and narrower battery packs which can have better force propagation than traditional shorter and wider battery packs.

The disclosed solutions can include a battery pack that can define a bay. The bay can have a first bay wall and a second bay wall. The battery pack can include at least one battery cell. The battery cell can have a top portion (e.g., including the battery terminals) and a bottom portion. The battery cell can be disposed horizontally within the battery pack such that the top portion of the battery cell can face the first bay wall and the bottom portion of the battery cell can face the second bay wall. The battery pack can have various arrangements of battery cells and other components to provide the structure and thermal management necessary for the battery pack to function and remain protected. The battery cells can be arranged in an offset configuration to increase the number of battery cells that can be disposed in the battery pack while also reducing the overall height of the battery pack The disclosed solutions have a technical advantage of providing a battery cell arrangement for a battery pack that can reduce the overall height of a battery pack, while also allowing for the height of the battery pack to be adjusted in relatively small increments. For example, with vertical battery cells, the height of the battery pack can only be adjusted in increments based on the height of the battery cells, which is typically larger than the width or diameter of the battery cell. With horizontal battery cells, the height of the battery pack can be adjusted in increments based on the width of the battery cells.

Figure 1:
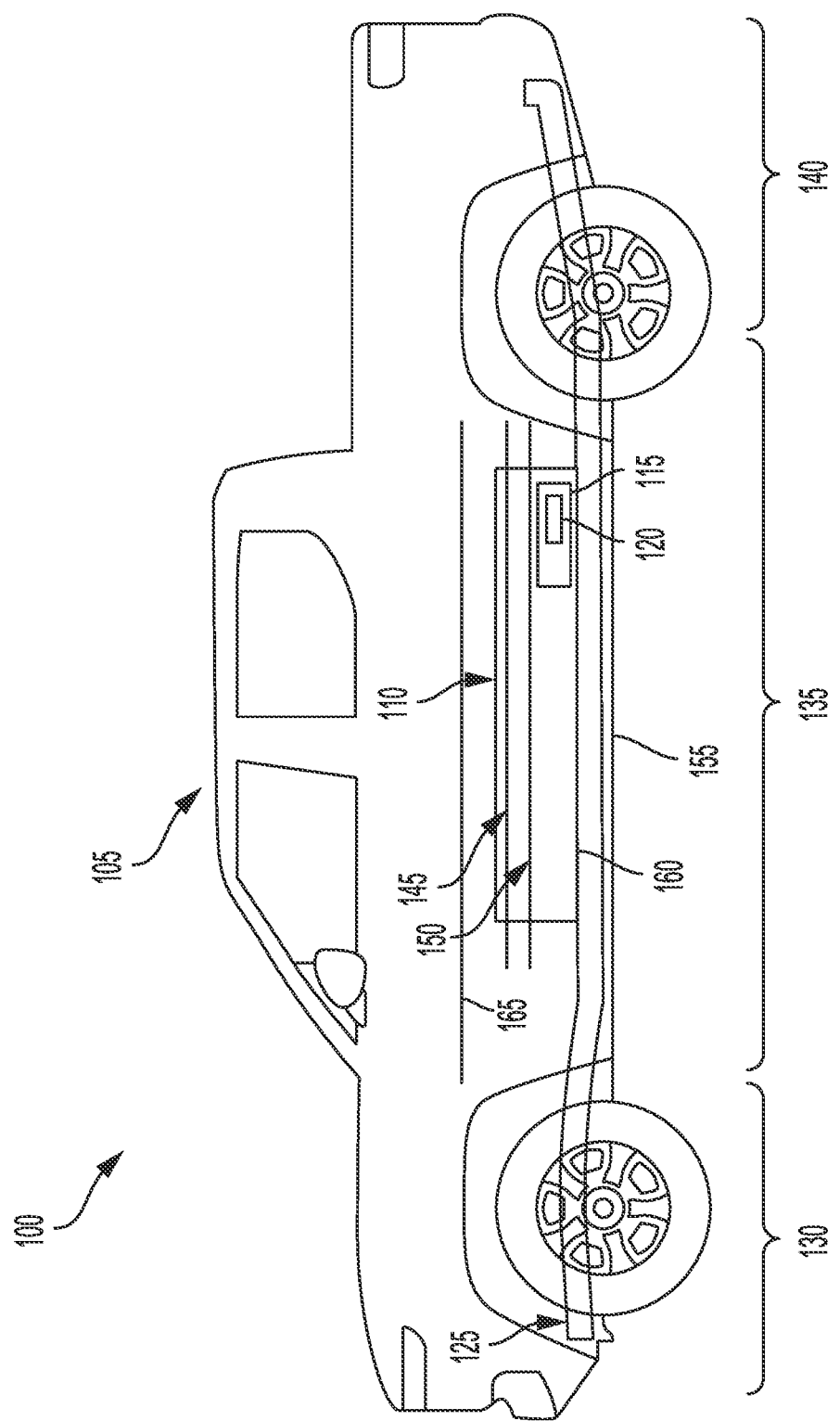
FIG. 1 depicts a cross-sectional view of an example electric vehicle, in accordance with some aspects.

FIG. 1 depicts is an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. Yet, it should also be noted that battery pack 110 may also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

The electric vehicle 105 can include a bottom surface 155. The chassis 125 of the vehicle 105 can be disposed above the bottom surface. The chassis 125 can have a top chassis surface 160. The top chassis surface 160 can be parallel (e.g., +/−10%) with the bottom surface 155. The top chassis surface 160 can support a battery pack 110 of the electric vehicle 105. The top chassis surface 160 can indirectly support at least one of the battery module 115 and the battery cell disposed in the battery pack 110. The vehicle 105 can include a vehicle floor 165. The vehicle floor 165 can be disposed above the battery pack 110. The vehicle floor 165 can be parallel with the bottom surface 155 and the top chassis surface 160.

Figure 2A:
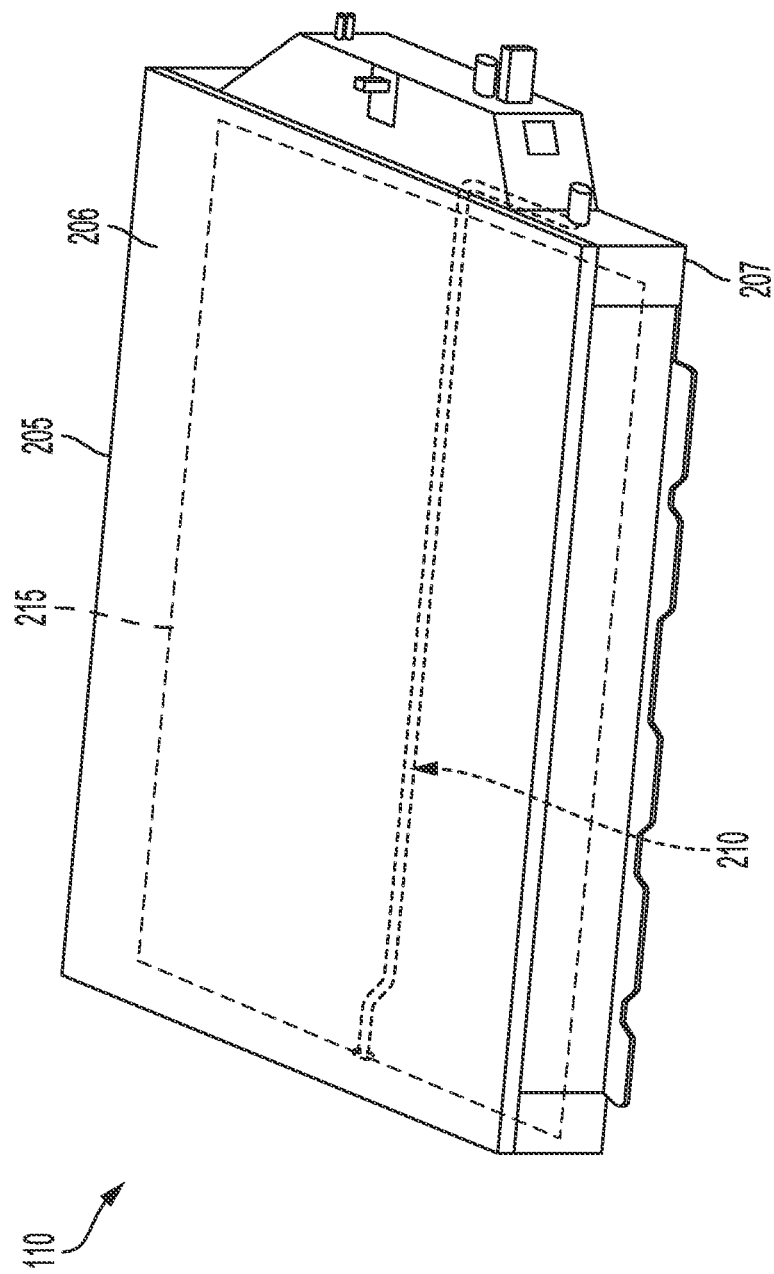
FIG. 2A depicts a perspective view of an example battery pack, in accordance with some aspects.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing can include at least one top surface 206. The housing 205 can include at least one bottom surface 207. The housing 205 can include at least one battery module 115 or at least one battery cell 120, as well as other battery pack components. The battery module 115 can be or can include one or more groups of prismatic cells, cylindrical cells, pouch cells, or other form factors of battery cells 120. The housing 205 can include a shield on the bottom or underneath the battery module 115 to protect the battery module 115 and/or cells 120 from external conditions, for example if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component (e.g., cold plate) 215. The thermal component 215 can be positioned in relation to a top submodule and a bottom submodule, such as in between the top and bottom submodules, among other possibilities. The battery pack 110 can include any number of thermal components 215. For example, there can be one or more thermal components 215 per battery pack 110, or per battery module 115. At least one cooling line 210 can be coupled with, part of, or independent from the thermal component 215.

Figure 2B:
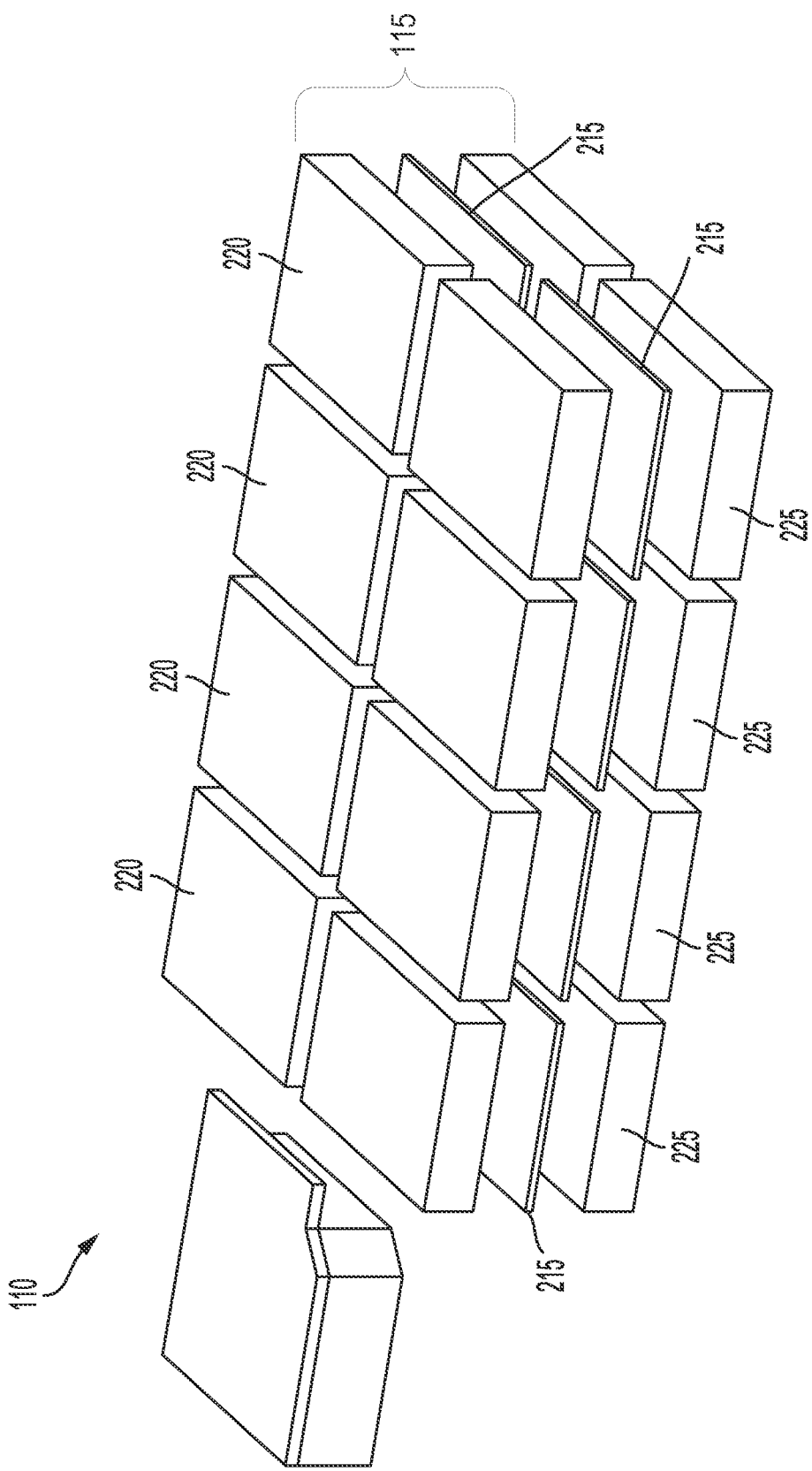
FIG. 2B depicts an exploded view of an example battery pack, in accordance with some aspects.

FIG. 2B depicts example battery modules 115. The battery modules 115 can include at least one submodule. For example, the battery modules 115 can include at least one first (e.g., top) submodule 220 or at least one second (e.g., bottom) submodule 225. At least one thermal component 215 can be disposed between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The thermal components 215 shown adjacent to each other can be combined into a single thermal component 215 that spans the size of one or more submodules 220 or 225. The thermal component 215 can be positioned underneath submodule 220 and over submodule 225, in between submodules 220 and 225, on one or more sides of submodules 220, 225, among other possibilities. The thermal component 215 can be disposed in sidewalls, cross members, structural beams, among various other components of the battery pack, such as battery pack 110 described above. The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a thermal component 215 in between the top submodule 220 and the bottom submodule 225. The battery pack 110 can include or define a plurality of areas for positioning of the battery module 115 and/or cells 120. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120. It should be noted the illustrations and descriptions herein are provided for example purposes and should not be interpreted as limiting. For example, the battery cells 120 can be inserted in the battery pack 110 without battery modules 220 and 225. The battery cells 120 can be disposed in the battery pack 110 in a cell-to-pack configuration without modules 220 and 225, among other possibilities.

Figure 2C:
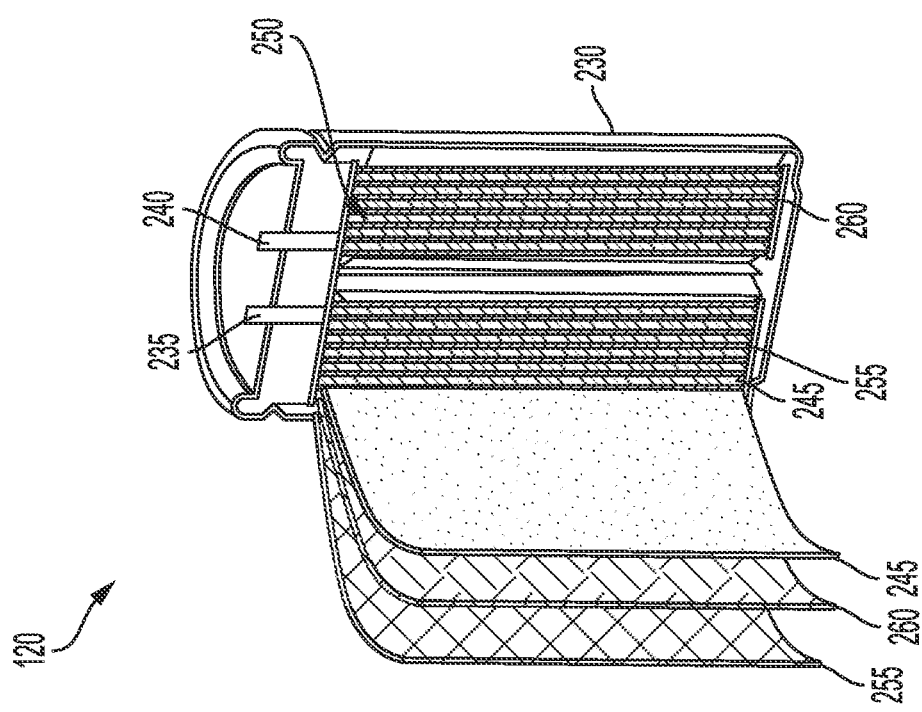
FIG. 2C depicts a cross-sectional view of an example battery cell, in accordance with some aspects.

FIG. 2C depicts an example cross sectional view of a battery cell 120. The battery modules 115 can each include a plurality of battery cells 120. Battery cells 120 have a variety of form factors, shapes, or sizes. For example, battery cells 120 can have a cylindrical, rectangular, square, cubic, flat, pouch, elongated or prismatic form factor. As depicted in FIG. 2C, for example, the battery cell 120 can be cylindrical. Battery cells 120 can be assembled, for example, by inserting a winded or stacked electrode roll (e.g., a jelly roll) including electrolyte material into at least one housing 230. The electrolyte material, e.g., an ionically conductive fluid or other material, can support electrochemical reactions at the electrodes to generate, store, or provide electric power for the battery cell by allowing for the conduction of ions between a positive electrode and a negative electrode. The housing 230 can be of various shapes, including cylindrical or rectangular, for example. Electrical connections can be made between the electrolyte material and components of the battery cell 120. For example, electrical connections to the electrodes with at least some of the electrolyte material can be formed at two points or areas of the battery cell 120, for example to form a first polarity terminal 235 (e.g., a positive or anode terminal) and a second polarity terminal 240 (e.g., a negative or cathode terminal). The polarity terminals can be made from electrically conductive materials to carry electrical current from the battery cell 120 to an electrical load, such as a component or system of the electric vehicle 105.

The battery cell 120 can be included in battery modules 115 or battery packs 110 to power components of the electric vehicle 105. The battery cell housing 230 can be disposed in the battery module 115, the battery pack 110, or a battery array installed in the electric vehicle 105. The housing 230 can be of any shape, such as cylindrical with a circular (e.g., as depicted in FIG. 2C, among others), elliptical, or ovular base, among others. The shape of the housing 230 can also be prismatic with a polygonal base or include a pouch form factor. The housing 230 can include other form factors, such as a triangle, a square, a rectangle, a pentagon, and a hexagon, among others. In some embodiments, the battery pack may not include modules (e.g., module-free). For example, the battery pack can have a module-free or cell-to-pack configuration where the battery cells are arranged directly into a battery pack without assembly into a module.

The battery cell 120 can include at least one anode layer 245, which can be disposed within a cavity 250 defined by the housing 230. The anode layer 245 can include a first redox potential. The anode layer 245 can receive electrical current into the battery cell 120 and output electrons during the operation of the battery cell 120 (e.g., charging or discharging of the battery cell 120).

The battery cell 120 can include at least one cathode layer 255 (e.g., a composite cathode layer compound cathode layer, a compound cathode, a composite cathode, or a cathode). The cathode layer 255 can include a second redox potential that can be different than the first redox potential of the anode layer 245. The cathode layer 255 can be disposed within the cavity 250. The cathode layer 255 can output electrical current out from the battery cell 120 and can receive electrons during the discharging of the battery cell 120. The cathode layer 255 can also receive lithium ions during the discharging of the battery cell 120. Conversely, the cathode layer 255 can receive electrical current into the battery cell 120 and can output electrons during the charging of the battery cell 120. The cathode layer 255 can release lithium ions during the charging of the battery cell 120.

The battery cell 120 can include a layer 260 disposed within the cavity 250. The layer 260 can include a solid electrolyte layer. The layer 260 can include a separator wetted by a liquid electrolyte. The layer 260 can include a polymeric material. The layer 260 can include a polymer separator. The layer 260 can be arranged between the anode layer 245 and the cathode layer 255 to separate the anode layer 245 and the cathode layer 255. The polymer separator can physically separate the anode and cathode from a cell short circuit. A separator can be wetted with a liquid electrolyte. The liquid electrolyte can be diffused into the anode layer 245. The liquid electrolyte can be diffused into the cathode layer 255. The layer 260 can help transfer ions (e.g., Li$^+$ ions) between the anode layer 245 and the cathode layer 255. The layer 260 can transfer Li$^+$ cations from the anode layer 245 to the cathode layer 255 during the discharge operation of the battery cell 120. The layer 260 can transfer lithium ions from the cathode layer 255 to the anode layer 245 during the charge operation of the battery cell 120.

Figure 3A:
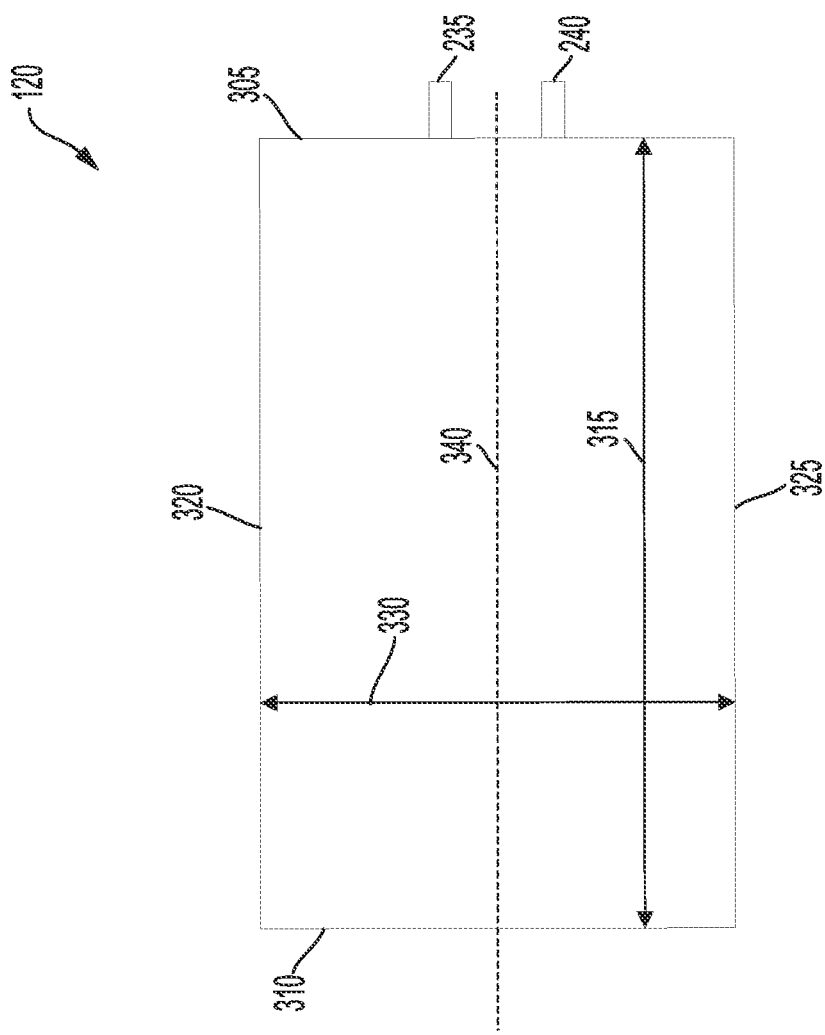
FIG. 3A depicts a front view of an example battery cell, in accordance with some aspects.

FIG. 3A depicts a front view of a battery cell 120. The battery cell 120 can have a first portion or end, shown as top portion 305, and a second portion or end, shown as bottom portion 310. The top portion 305 can be disposed opposite the bottom portion 310. The top portion 305 can include at least one terminal. For example, the top portion 305 can include at least one of the first polarity terminal 235 and the second polarity terminal 240. The top portion 305 can include a plurality of terminals. For example, the top portion 305 can include both the first polarity terminal 235 and the second polarity terminal 240. The top portion 305 can have a top surface on which at least one of the first polarity terminal 235 and the second polarity terminal 240 is disposed. The bottom portion 310 can have a bottom surface facing a direction opposite to the direction in which the top surface faces. The battery cell 120 can have a length 315. The length 315 can be the distance between the top surface of the top portion 305 and the bottom surface of the bottom portion 310. The battery cell 120 can have a first side 320 and a second side 325. The first side 320 can be opposite the second side 325. In the example in which the battery cell 120 has a circular or round exterior shape (e.g., the battery cell 120 has a cylindrical shape), the first side 320 can be a first edge and the second side 325 can be an opposite edge. The first side 320 and the second side 325 can indicate opposing sides of the battery cell 120. The first side 320 can be any side of the battery cell 120 and the second side 325 can be any side that is opposite the first side. For example, with reference to FIG. 3, with the battery cell 120 disposed horizontally with the terminals 235, 240 disposed on the right, the first side 320 can be on the top and the second side 325 can be on the bottom, or vice versa. With the battery cell 120 disposed horizontally with the terminals 235, 240 disposed on the left, the first side 320 can remain on the top and the second side 325 can remain on the bottom, or vice versa. The battery cell 120 can have a width 330. The width 330 can be the distance between the first side 320 and the second side 325. The width 330 can be a diameter of the battery cell 120 in the example in which the battery cell 120 has a round (e.g., cylindrical) shape. The length 315 can be greater than the width 330.

The battery cell 120 can define or be centered on a central axis 340. For example, the central axis 340 can extend between the top portion 305 and the bottom portion 310. The first side 320 of the battery cell 120 can be a distance away from the central axis 340. The second side 325 can be substantially the same distance (e.g., +/−10%) away from the central axis 340. The battery cell 120 can have a cylindrical shape that is centered on the central axis 340.

Figure 3B:
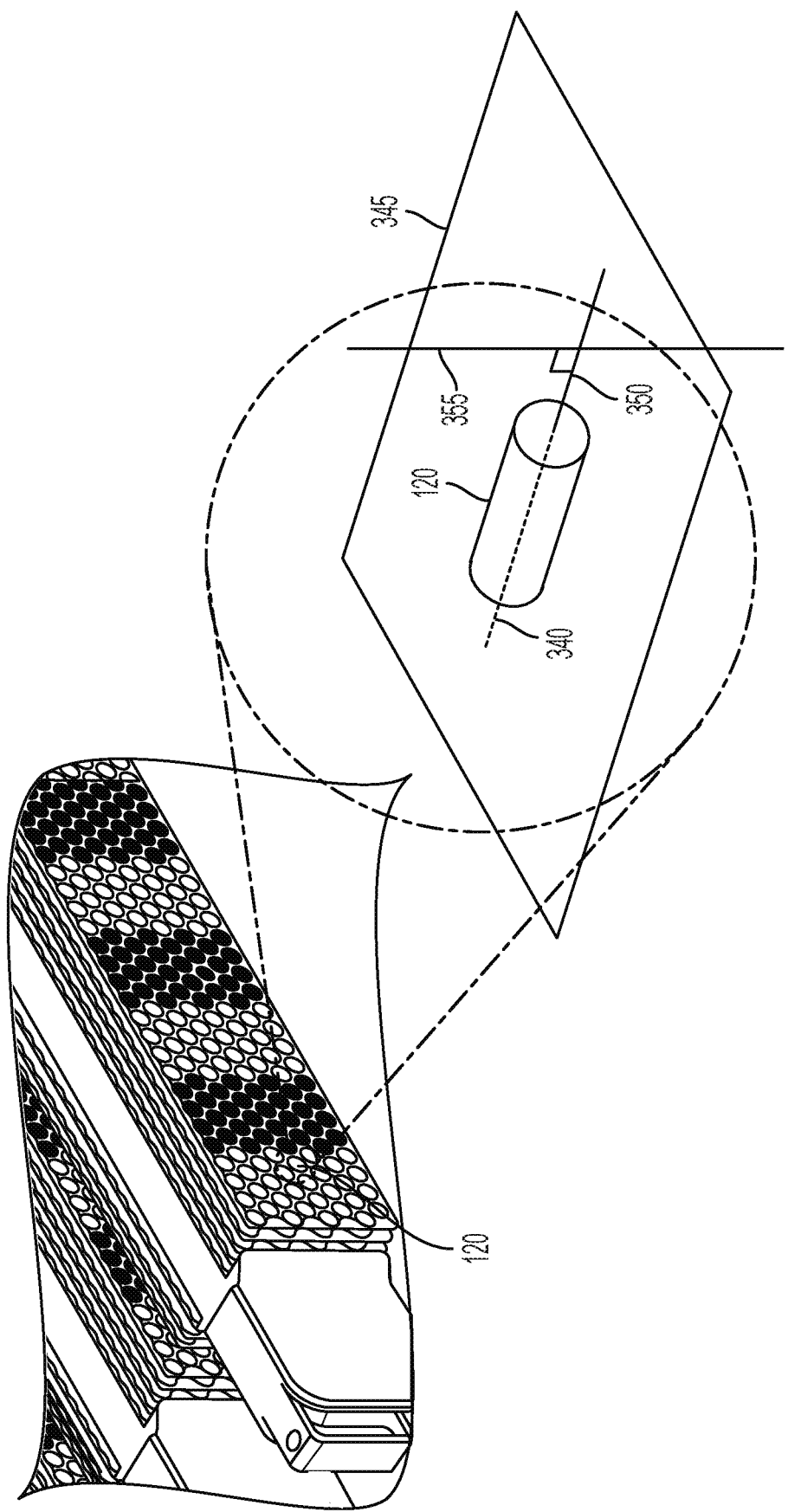
FIG. 3B depicts an enlarged perspective view of an example battery cell relative to an example horizontal plane, in accordance with some aspects.

FIG. 3B depicts an enlarged perspective view of an example battery cell 120 relative to an example horizontal plane 345. The horizontal plane 345 can include a first axis, shown as X-axis 350. The X-axis 350 can be in the horizontal plane 345. The battery cell 120 can be disposed in a horizontal orientation such that the central axis 340 of the battery cell 120 is parallel with the horizontal plane 345. For example, the battery cell 120 can be oriented horizontally and be disposed above, below, or in the horizontal plane 245. A vertical orientation can include the central axis 340 of the battery cell 120 being parallel with the Y-axis 355 and being perpendicular to the horizontal plane 245.

The bottom surface 155 of the electric vehicle 105 can define a first horizontal plane 345. The top chassis surface 160 of the chassis 125 of the electric vehicle 105 can define a second horizontal plane. The second horizontal plane 345 can be parallel (e.g., +/−10%) with the first horizontal plane 345. The vehicle floor 165 of the electric vehicle 105 can define a third horizontal plane 345. The third horizontal plane 345 can be parallel with the first and second horizontal planes 345. The battery cell 120 can be disposed horizontally in the battery pack 110 of the electric vehicle 105. For example, a battery pack 110 can be disposed in an electric vehicle 105. At least one of the top surface 206 and the bottom surface 207 can be parallel with at least one of the first, second, and third horizontal planes 345. For example, the bottom surface 207 of the of the battery pack 110 can be parallel with the first horizontal plane 345 defined by the bottom surface 155 of the electric vehicle 105. The battery cell 120 can be oriented horizontally such that the central axis 340 is parallel with the bottom surface 207 of the battery pack 110 and the first horizontal plane 345.

Figure 4:
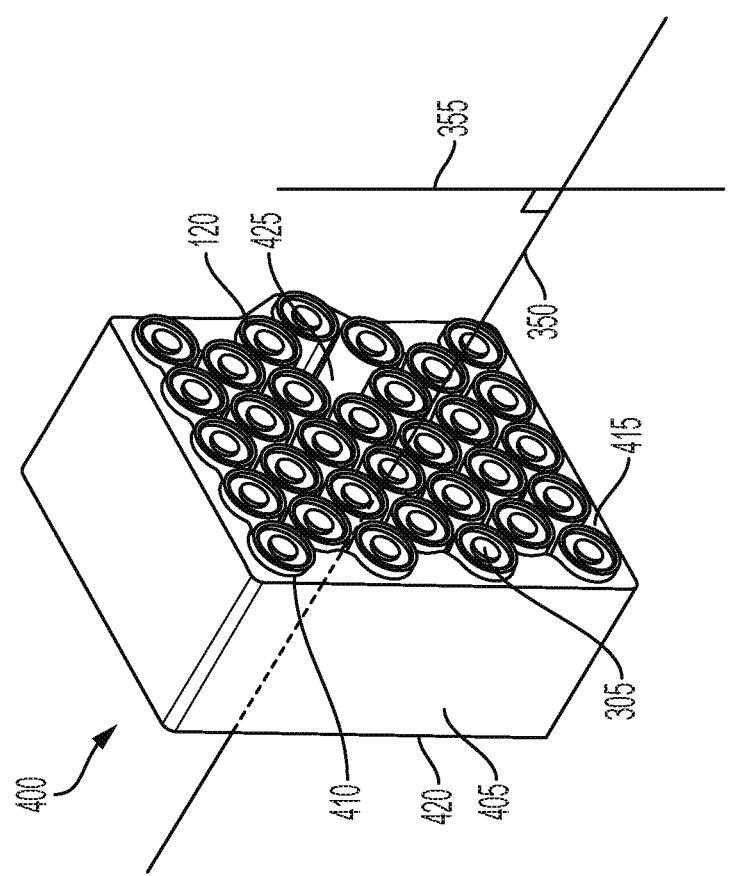
FIG. 4 depicts a perspective view of an example battery cell group, in accordance with some aspects.
Figure 5:
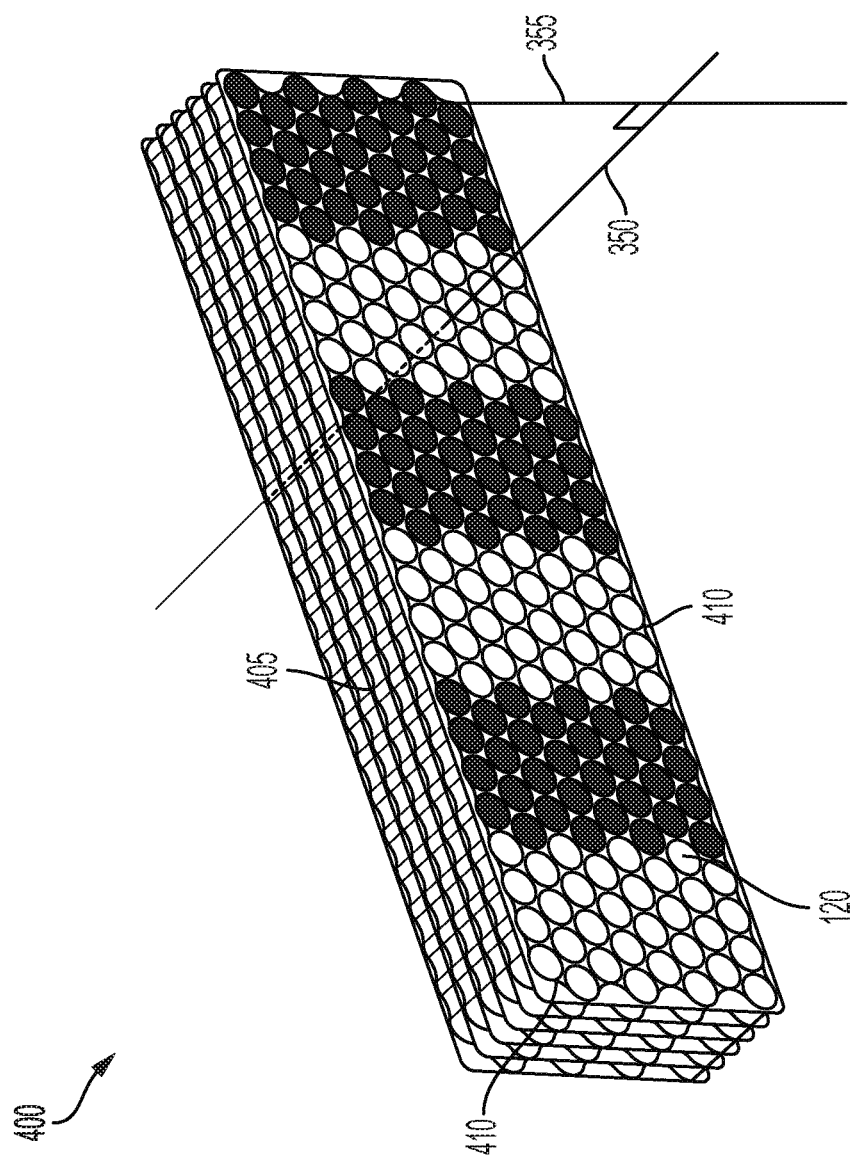
FIG. 5 depicts a perspective view of an example battery cell group, in accordance with some aspects.

FIGS. 4 and 5 depict perspective views of example battery cell groups 400. The battery cell group 400 can be disposed in a battery pack 110. The battery cell group can have any shape or size, and can have any number of battery cells 120 having any shape or size. The battery cell group 400 can include a battery cell case 405. The battery cell case 405 can contain, house, and receive battery cells 120 in the horizontal arrangement disclosed herein within the battery pack 110. The battery cell case 405 can be injection molded. The battery cell case 405 can be made from any material (e.g., plastic) capable of holding the shape of the battery cells 120 and performing the functions described herein. The battery cell case 405 can have a smooth exterior. The battery cell case 405 can define at least one pocket 410 (e.g., a volume, a space, a slot, and so on) to receive a battery cell 120. The battery cell case 405 can have one larger pocket 410 to receive all of the battery cells 120 or a plurality of pockets 410 each to receive at least one of the battery cells 120. For example, the battery cell case 405 can define a pocket 410 sized and shaped to receive each individual battery cell 120. The battery cells 120 can remain in the battery cell case 405 by forces applied by the battery cell case 405 on the battery cells 120 or by an adhesive between the battery cells 120 and the walls of the pockets of the battery cell case 405, among others.

The each of the plurality of battery cells 120 disposed in the battery cell case 405 can be oriented in the same direction or in parallel directions. For example, the battery cell case 405 can have a front side 415 and a rear side 420 opposite to the front side 415. The top portion 305 of each battery cell 120 can be disposed proximate to or at the front side 415 and the bottom portion 310 can be disposed proximate to or at the rear side 420. The battery cell case 405 can include a connection feature 425. For example, a pocket 410 may be replaced with a mechanical component to facilitate coupling of the battery cell group 400 with another component of a battery pack 110. For example, the connection feature 425 can be disposed within the battery cell case 405 such that battery cells 120 at least partially surround the connection feature 425.

The battery cell group 400 depicted in FIG. 4, among others, can be referred to as a single P-group or brick. The battery cells 120 of a single P-group can be connected in electrical parallel. For example, the battery cells 120 of a single P-group can share a voltage. A single P-group can include any number of battery cells 120.

The battery cell group 400 depicted in FIG. 5, among others, can be referred to as a multi P-group or brick. The multi P-group can include a plurality of single P-groups. For example, the color coding in FIG. 5, among others, can indicate different P-groups. The plurality of P-groups can be connected in electrical series. For example, the alternating color coding can indicate a continuous step increase in total voltage of the battery cell group 400 due to the p-groups being connected in electrical series. A battery cell group 400 can include six P-groups connected in electrical series, as shown in FIG. 5, among others. A battery cell group 400 can include any number of P-groups, and each P-group can include any number of battery cells 120.

Figure 6:
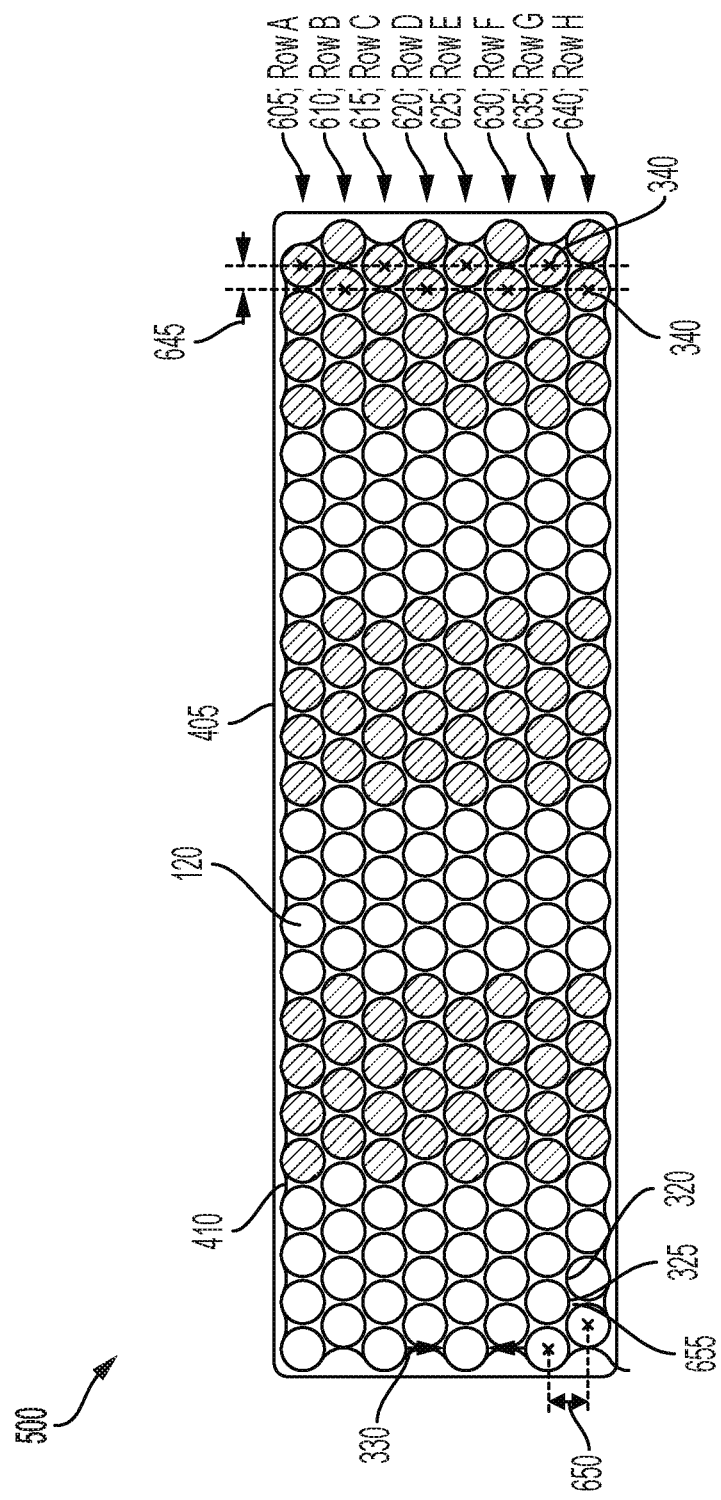
FIG. 6 depicts a front view of an example battery cell group, in accordance with some aspects.

FIG. 6 depicts a front view of battery cell group 400. The battery cell group 400 can arrange a plurality of battery cells 120 into a plurality of rows. For example, a first subset of battery cells 120 (e.g., at least one battery cell 120) can be disposed in a first row, shown as Row A 605, a second subset of battery cells 120 can be disposed in a second row, shown as Row B 610, a third subset of battery cells 120 can be disposed in a third row, shown as Row D 615, a fourth subset of battery cells 120 can be disposed in a fourth row, shown as Row D 620, a fifth subset of battery cells 120 can be disposed in a fifth row, shown as Row E 625, a sixth subset of battery cells 120 can be disposed in a sixth row, shown as Row F 630, a seventh subset of battery cells 120 can be disposed in a seventh row, shown as Row G 635, and an eight subset of battery cells 120 can be disposed in an eighth row, shown as Row H 640. The battery cell group 500 can have any number of rows. Each row can be in a different horizontal plane 345.

The battery cells 120 in different rows 605-640 can be arranged such that there is a first offset 645 between some of the battery cells 120. The first offset 645 can be a horizontal offset measured between a central axis 340 of a first battery cell 120 in a first row and a central axis 340 of a second battery cell 120 in an adjacent row. The first offset 645 can be a horizontal offset such that a central axis 340 of the first battery cell 120 is not directly above or below a central axis 340 of the second battery cell 120. For example, a first battery cell 120 in a first row (e.g., Row A 605) can be offset from a second battery cell 120 in an adjacent second row (e.g., Row B 610). The offset 645 can be approximately (e.g., +/−10%) half of the width 330 of the battery cells 120.

The battery cells 120 can be arranged such that there is no first offset 645 and some of the battery cells 120 are aligned. For example, the central axis 340 of the first battery cell 120 in the first row (e.g. Row A 605) can be aligned with a central axis 340 of a third battery cell 120 in a third row (e.g., Row C 615). The rows 605-640 can be alternating such that battery cells 120 in a first set of rows (e.g., Rows A, C, E, and G) are aligned and battery cells 120 in a second set of rows (e.g., Rows B, D, F, and H) are aligned and the battery cells 120 of the first set of rows are offset from the battery cells 120 of the second set of rows. Each row from the first set of rows can be disposed between two adjacent rows from the second set of rows. Each row can be horizontally offset from an adjacent row and horizontally aligned with an alternating row.

The battery cells 120 can be arranged such that there is a second offset 650 between some of the battery cells 120. The second offset 650 can be a vertical offset measured between a central axis 340 of a first battery cell 120 in a first row and a central axis 340 of a second battery cell 120 in an adjacent row. The second offset 650 can be a vertical offset such that a central axis 340 of a first battery cell 120 is not in the same horizontal plane 345 (e.g., not directly next to) a central axis of a second battery cell 120. The second offset 650 can be perpendicular to the first offset 645. The second offset 650 can be less than the width 330 (e.g., the diameter) of one of the battery cells 120. For example, two adjacent battery cells 120 in a first row (e.g., Row H 640) can define a recess 655 between the two battery cells 120. A battery cell 120 in an adjacent second row (e.g., Row G 635) can be disposed, at least partially, in the recess 655. As such, a second side 325 (e.g., bottom side) of the battery cell 120 in the second row can be disposed below a first side 320 (e.g., top side) of the battery cells 120 in the first row.

A height of the battery pack 110 can be based, at least partially, on the battery cell width 330 and the arrangements of the battery cells 120 in the battery pack 110. For example, the plurality of battery cells 120 can be arranged horizontally in rows. The height of the battery pack 110 can be based on the number of rows of battery cells and the widths 330 of the battery cells. For example, a battery pack 110 with a single row of battery cells 120 can have a height that accommodates a single width 330 of a battery cell 120. A battery pack 110 with a plurality of rows of battery cells 120 can have a larger height that accommodates the plurality of widths 330 of the battery cells 120 in the plurality of rows. With the width 330 being smaller than the length 315, the height of the battery pack 110 can be modified by smaller increments than when the height is based on the length 315 (e.g., if the battery cells 120 were oriented vertically).

Figure 7:
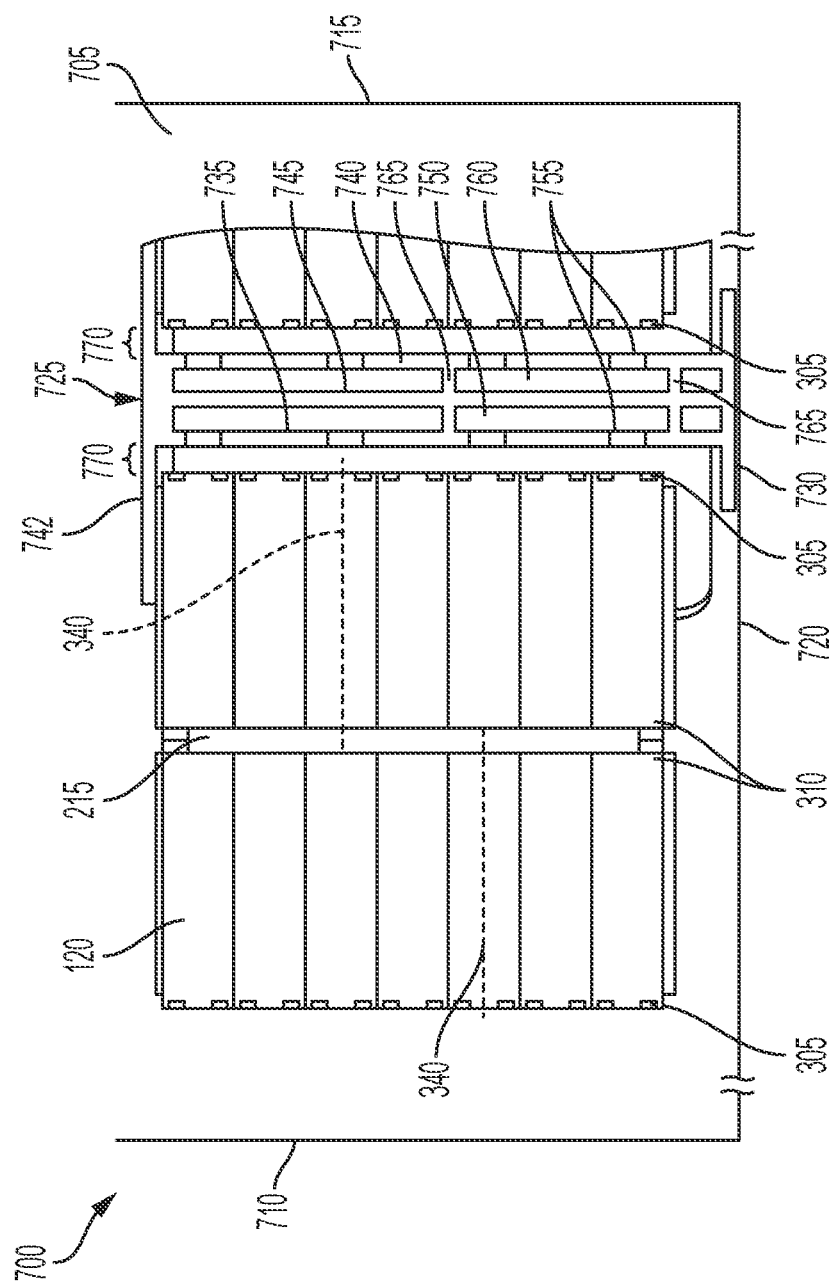
FIG. 7 depicts a cross-sectional view of a portion of an example battery pack, in accordance with some aspects.

FIG. 7 depicts a front cross-sectional view of a portion of an example battery pack 700. The battery pack 700 can be or include battery pack 110. The battery pack 700 can include a bay 705. The bay 705 can receive or retain various components of the battery pack 700. The bay 705 can have a first bay wall 710 and a second bay wall 715. The first bay wall 710 can be disposed opposite the second bay wall 715. The first bay wall 710 and the second bay wall 715 can be sidewalls of the battery pack 700. The bay 705 can have a base 720. The first bay wall 710 and the second bay wall 715 can extend from the base 720. For example, at least one of the first bay wall 710 and the second bay wall 715 can extend perpendicular from the base 720. The base 720 can define a bottom surface of the battery pack 700.

The battery pack 700 can include at least one structural member 725. The structural member 725 can absorb and disperse forces exerted on the battery pack 700 such that battery cells 120 disposed in the battery pack 700 receive less of the force. The structural member 725 can be any material that can retain the desired shaped and perform the functions described herein. For example, the structural member 725 can be made of a plastic or a metal. The structural member 725 can be disposed in the bay 705. For example, the structural member 725 can be disposed between the first bay wall 710 and the second bay wall 715. The structural member 725 can interface with (e.g., contact directly or indirectly) or couple with the base 720 of the battery pack 700. The structural member 725 can have a rectangular shape that extends away from the base 720. The structural member 725 can have at least one member base 730. The member base 730 can interface with, connect to, or couple with the base 720. The structural member 725 can have a first outer wall 735 and a second outer wall 740. The first outer wall 735 and the second outer wall 740 can extend from the member base 730. For example, the first outer wall 735 and the second outer wall 740 can extend vertically from the member base 730. The member base 730 can be coupled with or integral with first outer wall 735 and the second outer wall 740. The member base 730 can be wider than a distance between the first outer wall 735 and the second outer wall 740. The structural member 725 can have at least one member flange 742. The member flange 742 can be disposed away from the member base 730. For example, the first outer wall 735 and the second outer wall 740 can extend between the member base 730 and the member flange 742. The member flange 742 can be coupled with or integral with first outer wall 735 and the second outer wall 740. The member flange 742 can be wider than a distance between the first outer wall 735 and the second outer wall 740. The member flange 742 can be wider than member base 730. The member flange 742 can be the same width as the member base 730. The member flange 742 can have the same width as the member base 730.

The structural member 725 can include at least one inner wall 745. The inner wall 745 can be disposed between the first outer wall 735 and the second outer wall 740 and spaced apart with at least one channel therebetween. The first outer wall 735 and the inner wall 745 can define a first channel 750. The first channel 750 can provide a path for gases to flow out of the battery pack 700. The first outer wall 735 can have at least one opening 755. The opening 755 can extend through the first outer wall 735 and expose the first channel 750. The opening 755 can define a path for gases to flow into the first channel 750. The first outer wall 735 can have a plurality of openings 755. The second outer wall 740 and the inner wall 745 can define a second channel 760. The second channel 760 can provide a path for gases to flow out of the battery pack 700. The second outer wall 740 can have at least one opening 755. The opening 755 can extend through the second outer wall 740 and expose the second channel 760. The opening 755 can define a path for gases to flow into the second channel 760. The second outer wall 735 can have a plurality of openings 755. The battery cell 120 can emit gases and the gases can be vented through and out of the battery pack 700 via the first and second channels 750, 760. The separate channels 750, 760 can prevent gases from one side of the structural member 725 from traveling over to battery cells 120 disposed on the other side of the structural member 725. The structural member 725 can have at least one support member 765. The support member 765 can extend between the first outer wall 735 and the second outer wall 740. The support member 765 can provide additional strength and support to the structural member 725.

The battery pack 700 can include at least one battery cell 120. The battery cell 120 can be disposed in the bay 705. For example, the battery cell 120 can be disposed between the first bay wall 710 and the second bay wall 715. The battery cell 120 can be disposed horizontally within the battery pack 700. For example, a top portion 305 and a bottom portion 310 can face opposite bay walls 710, 715 of the battery pack 700. For example, the top portion 305 of the battery cell 120 can face at least one of the first bay wall 710 and the second bay wall 715. The bottom portion 310 of the battery cell 120 can face the other one of the at least one of the first bay wall 710 and the second bay wall 715. The battery cell 120 can be parallel with the base 720 of the battery pack 700. For example, the central axis 340 of the battery cell 120 can be parallel with at least a portion of the base 720 of the battery pack 700.

The battery cell 120 can be disposed adjacent to the structural member 725. The top portion 305 of the battery cell 120 can be disposed adjacent to and face the structural member 725. For example, the top portion 305 of the battery cell 120 can be adjacent to one of the first outer wall 735 and the second outer wall 740 of the structural member 725. The bottom portion 310 of the battery cell 120 can be disposed away from the first outer wall 735 or the second outer wall 740. The top portion 305 of a battery cell 120 can be disposed a distance away from the outer wall 735, 740 of the structural member to define a gap 770. The gap 770 can facilitate proper venting of the battery cells(s) 120 within the battery pack 700. For example, a top portion 305 of the battery cell 120 can be disposed adjacent to the first outer wall 735. Gas emitted by a battery cell 120 can flow through the gap 770 to an opening 755 of the first outer wall 735 and into the first channel 750.

The battery pack 700 can include a plurality of battery cells 120. For example, the battery pack 700 can have a first battery cell 120 disposed in the bay 705. The first battery cell 120 can be disposed horizontally such that the top portion 305 is facing the first bay wall 710 and the bottom portion 310 is facing the second bay wall 715. The second battery cell 120 can be disposed horizontally such that the bottom portion 310 is facing the first bay wall 710 and the top portion 305 is facing the second bay wall 715. For example, the bottom portion 310 of the first battery cell 120 can be facing the bottom portion 310 of the second battery cell 120. The second battery cell 120 can be disposed adjacent to the structural member 725. For example, the second battery cell 120 can be disposed between the first battery cell 120 and the structural member 725. The top portion 305 of the second battery cell 120 can face the structural member 725. The bottom portion 310 of the first battery cell 120 can face the structural member 725.

The battery pack 700 can include a thermal component 215 (e.g., a cold plate). The thermal component 215 can be disposed between the first battery cell 120 and the second battery cell 120 to transfer heat away from the battery cells 120. For example, the bottom portion 310 of the first battery cell 120 can interface with or couple with a first side of the thermal component 215. The bottom portion 310 of the second battery cell 120 can interface with or couple with a second side of the thermal component 215. The battery cells 120 can couple with the thermal component 215 via an adhesive, for example.

The battery pack 700 can include at least one battery cell group 400. For example, at least one battery cell group 400 can be disposed on the first side of the thermal component 215 and at least one battery cell group 400 can be disposed on the second side of the thermal component 215. The battery cell group 400 can be oriented in the bay 705 of the battery pack 700 such that the battery cells 120 are disposed as described above. For example, a first battery cell group 400 can include a first set of battery cells 120 and a second battery cell group 400 can include a second set of battery cells 120. The first battery cell group 400 and the second battery cell group 400 can be oriented such that the bottom portions 310 of the first set and second set of battery cells 120 face each other. A plurality of battery cell groups 400 can be disposed on at least one of the first side and the second side of the thermal component 215. For example, a first set of battery cell groups 400 can be disposed on the first side and a second set of battery cell groups 400 can be disposed on the second side.

A battery cell group 400 can be coupled with the structural member 725. For example, a side (e.g., a top) of the battery cell group 400 can couple with the member flange 742 of the structural member 725. The member flange 742 can position the battery cell group 400 such that a top portion 305 of a battery cell 120 of the battery cell group 400 is facing the structural member 725 and is spaced apart from at least one of the first outer wall 735 or the second outer wall 740.

Figure 8:
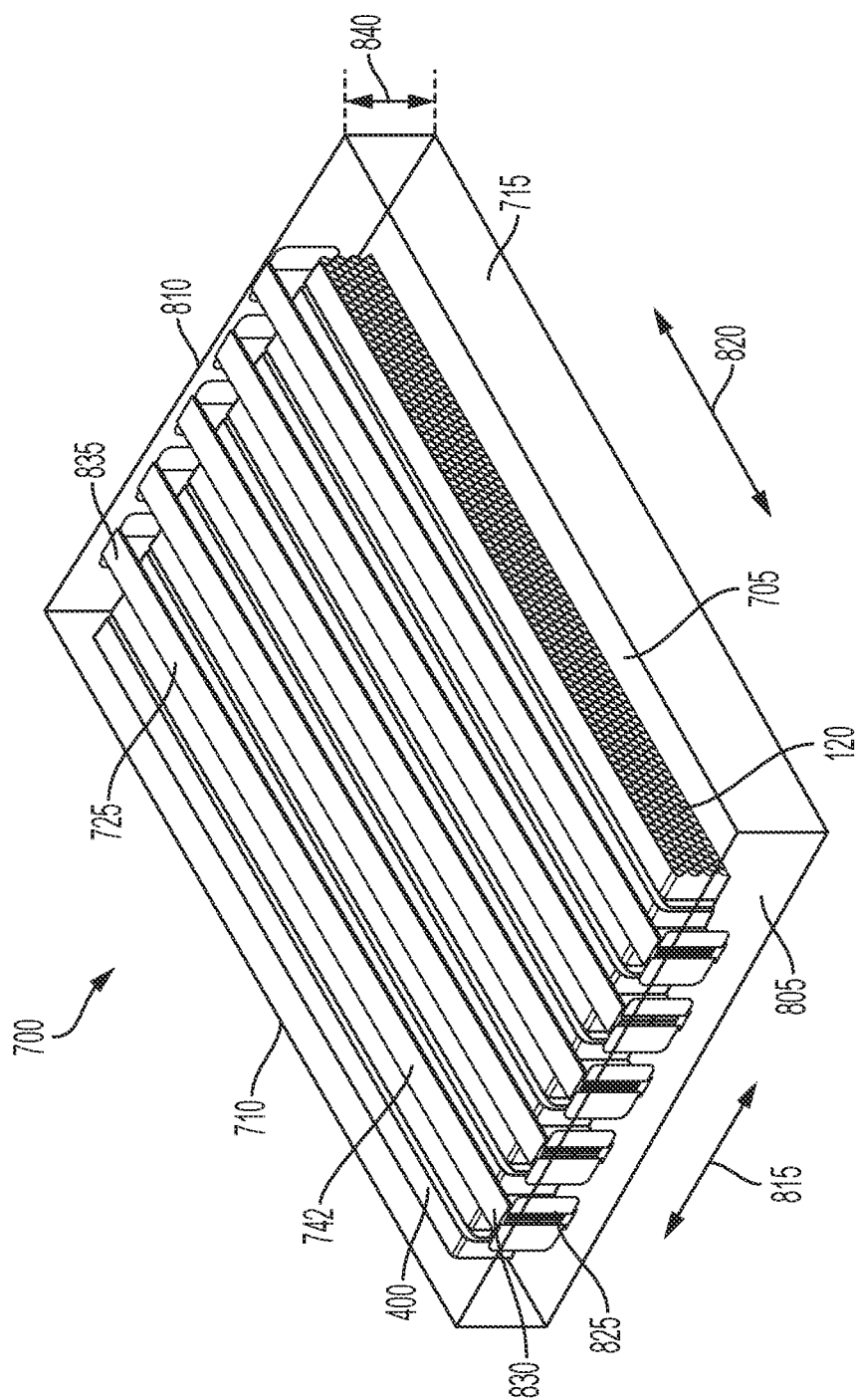
FIG. 8 depicts a perspective view of an example battery pack, in accordance with some aspects.

FIG. 8 depicts a perspective view of battery pack 700. The battery pack 700 can have a first pack end 805 and a second pack end 810. The first pack end 805 and the second pack end 810 can extend between the first bay wall 710 and the second bay wall 715. The ends 805, 810 can extend along or parallel to an axial direction 815. The bay walls 710, 715 can extend in a longitudinal direction 820. The structural member 725 can extend in the longitudinal direction 820 within the battery pack 700. For example, the structural member 725 can be parallel with at least a portion of the first bay wall 710 or the second bay wall 715. The battery cell 120 can extend in the axial direction 815. For example, the central axis 340 of the battery cell 120 can be parallel with at least a portion of the first pack end 805 or the second pack end 810 and the base 720 of the battery pack 700.

The structural member 725 can extend in the axial direction 815 within the battery pack 700. For example, the structural member 725 can be parallel with at least a portion of the first pack end 805 or the second pack end 810 of the battery pack 700. The battery cell 120 can extend in the longitudinal direction 820. For example, the central axis 340 of the battery cell 120 can be parallel with at least a portion of the first bay wall 710 or the second bay wall 715 and the base 720 of the battery pack 700.

The battery pack 700 can include a plurality of battery cells 120. For example, a first battery cell 120 can be disposed on a first side of the structural member 725. A top portion 305 of the first battery cell 120 can face the structural member 725. A second battery cell 120 can be disposed on a second side of the structural member 725. A top portion 305 of the second battery cell 120 can face the structural member 725.

The battery pack 700 can include a plurality of battery cell groups 400. For example, a first battery cell group 400 can be disposed on a first side of the structural member 725. A second battery cell group 400 can be disposed on a second side of the structural member 725. A single battery cell group 400 can extend along a side of the structural member 725 or a plurality of battery cell groups 400 can be disposed along the same side of the structural member 725. For example, the battery cell group 400 can be one single long battery cell group 400 or a plurality of shorter battery cell groups 400 disposed adjacent to each other along the structural member 725. The battery cell groups 400 can be coupled with the structural member 725 via the member flange 742.

The battery pack 700 can include a plurality of structural members 725. For example, a first structural member 725 and a second structural member 725 can be disposed in the bay 705 such that the structural members 725 extend longitudinally along the battery pack 700. A plurality of battery cells 120 can be disposed between the first and second structural members 725. For example, a first battery cell 120 can be disposed between the first and second structural members 725 and adjacent to the first structural member 725. A top portion 305 of the first battery cell 120 can face the first structural member 725. A second battery cell 120 can be disposed between the first and second structural members 725 and adjacent to the second structural member 725. A top portion 305 of the second battery cell 120 can face to second structural member 725 (e.g., opposite direction than the top portion 305 of the first battery cell 120). A bottom portion 310 of the first battery cell 120 can face a bottom portion 310 of the second battery cell 120. A thermal component 215 can be disposed between the bottom portion 310 of the first battery cell 120 and the bottom portion 310 of the second battery cell 120. Battery cell groups 400 can be disposed between structural members 725 similar to the battery cells 120.

The battery pack 700 can have any number of structural members 725. For example, the battery pack 700 can have five structural members 725. The battery pack 700 can have at least two battery cell groups 400 (e.g., at least two battery cells 120) disposed between adjacent structural member 725. An outermost structural member 725 can have at least two battery cell groups 400 disposed between the structural member 725 and one of the first bay wall 710 and the second bay wall 715.

A structural member 725 can have at least one end flange 825. The end flange 825 can couple the structural member 725 with the battery pack 700. For example, the structural member 725 can have a first member end 830 and a second member end 835. The first member end 830 can be disposed proximate to the first pack end 805 of the battery pack 700. The second member end 835 can be disposed proximate to the second pack end 810. The end flange 825 can be disposed at at least one of the first member end 830 and the second member end 835. For example, a first end flange 825 can be coupled with or integral with the first member end 830. The first end flange 825 can couple with the first pack end 805 of the battery pack 700. A second end flange 825 can be coupled with or integral with the second member end 835. The second end flange 825 can couple with the second pack end 810 of the battery pack 700.

The battery pack 700 can have a battery pack height 840. The battery pack height 840 can be based, at least partially, on the width 330 of the battery cells 120. The battery pack height 840 can be based, at last partially, on the number of rows of battery cells 120. The battery pack height 840 can be incrementally adjusted by an amount equal to or less than a width 330 of the battery cell 120. For example, to add an additional row of battery cells to a battery cell group 400, the battery pack height 840 can increase by an amount less than the width 330 of the battery cell to accommodate the additional row. For example, since the additional battery cells 120 can be disposed, at least partially, in the recesses 655 defined by the adjacent row of battery cells 120, the additional height added by the new row of batter cells 120 is less than the width 330 of the battery cells 120.

Figure 9:
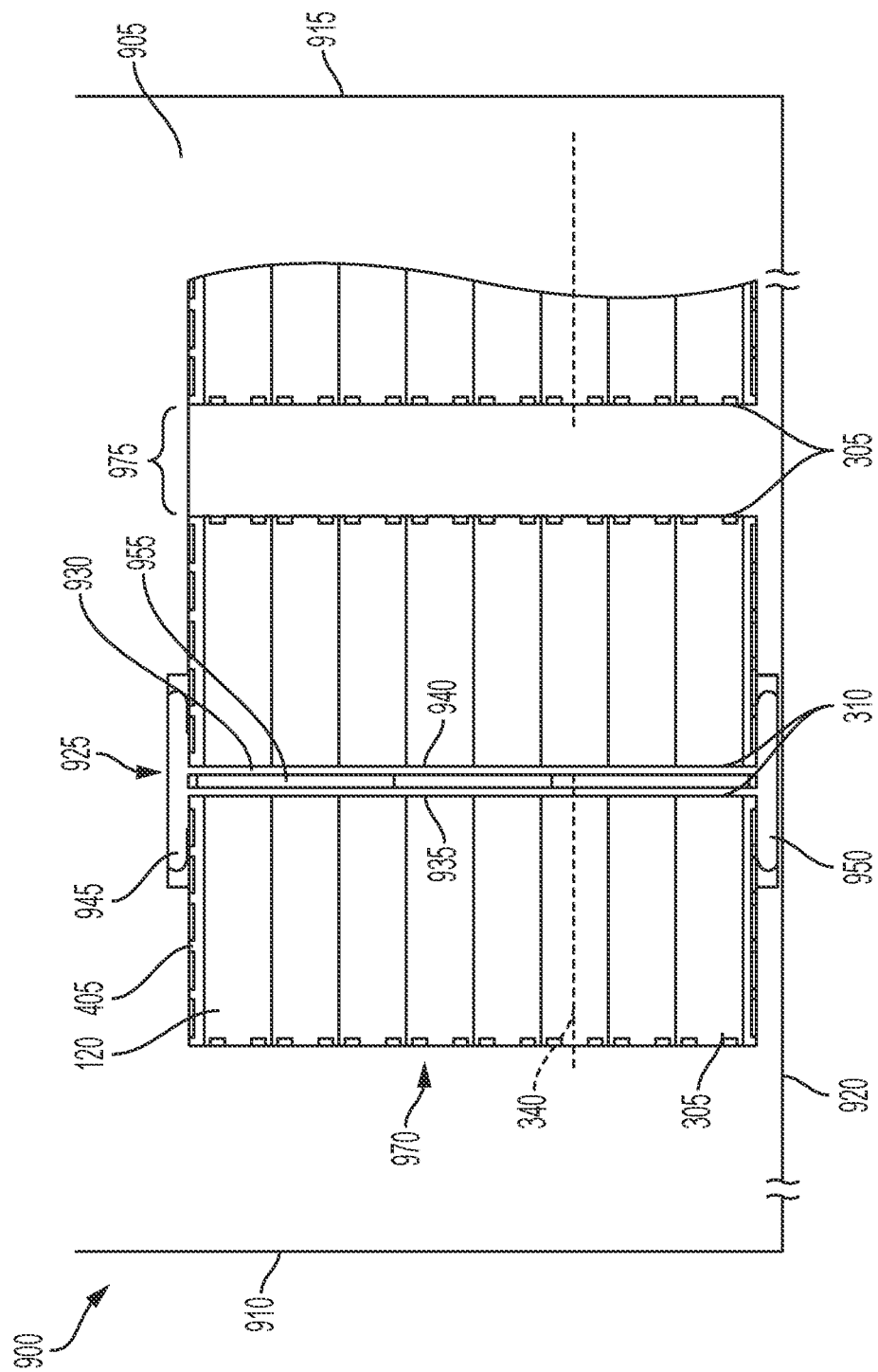
FIG. 9 depicts a cross-sectional view of a portion of an example battery pack, in accordance with some aspects.

FIG. 9 depicts a front cross-sectional view of a portion of an example battery pack 900. The battery pack 900 can be or include battery pack 110. The battery pack 900 can include a bay 905. The bay 905 can receive or retain various components of the battery pack 700. The bay 905 can have a first bay wall 910 and a second bay wall 915. The first bay wall 910 can be disposed opposite the second bay wall 915. The first bay wall 910 and the second bay wall 915 can be sidewalls of the battery pack 900. The bay 905 can have a base 920. The first bay wall 910 and the second bay wall 915 can extend from the base 920. For example, at least one of the first bay wall 910 and the second bay wall 915 can extend perpendicular from the base 920. The base 920 can define a bottom surface of the battery pack 900.

The battery pack 900 can include at least one structural member 925. The structural member 925 can absorb and disperse forces exerted on the battery pack 900 such that battery cells 120 disposed in the battery pack 900 receive less of the force. The structural member 925 can be any material that can retain the desired shaped and perform the functions described herein. For example, the structural member 925 can be made of a plastic or a metal. The structural member 925 can be disposed in the bay 905. For example, the structural member 925 can be disposed between the first bay wall 910 and the second bay wall 915. The structural member 925 can interface with or couple with the base 920 of the battery pack 700. The structural member 925 can be, or be shaped like, an I-beam. For example, the structural member 925 can have a body 930. The body can have a first member side 935 and a second member side 940 opposite the first side 935. The structural member 925 can have a first flange 945 disposed at a first end (e.g., top) of the body 930 and a second flange 950 disposed at a second end (e.g., bottom of the body 930. The body 930 can define a fluid channel 955. The fluid channel 955 can receive a fluid (e.g., coolant) such that the structural member 925 can thermally manage the battery cells 120 of the battery pack 900. For example, the structural member 925 can replace or supplement a thermal component 215 (e.g., a cold plate) of the battery pack 900.

The battery pack 900 can include at least one battery cell 120. The battery cell 120 can be disposed in the bay 905. For example, the battery cell 120 can be disposed between the first bay wall 910 and the second bay wall 915. The battery cell 120 can be disposed horizontally within the battery pack 900. For example, a top portion 305 and a bottom portion 310 can face opposite walls 910, 915 of the battery pack 900. For example, the top portion 305 of the battery cell 120 can face at least one of the first bay wall 910 and the second bay wall 915. The bottom portion 310 of the battery cell 120 can face the other one of the at least one of the first bay wall 910 and the second bay wall 915. The battery cell 120 can be parallel with the base 920 of the battery pack 900. For example, the central axis 340 of the battery cell 120 can be parallel with at least a portion of the base 920 of the battery pack 900.

The battery cell 120 can be disposed adjacent to the structural member 925. The bottom portion 310 of the battery cell 120 can be disposed adjacent to and face the structural member 925. For example, the bottom portion 310 of the battery cell 120 can be adjacent to the body 930 of the structural member 725. The top portion 305 of the battery cell 120 can be disposed away from the body 930. The bottom portion 310 of a battery cell 120 can interface with or be coupled with the body 930 of the structural member 925. For example, the bottom portion 310 of the battery cell 120 can be coupled with the body 930 via an adhesive. Contacting, either directly or indirectly (e.g., through an adhesive or some other intervening substance or material), can facilitate thermal management (e.g., cooling) of the battery cell 120 since fluid can flow through the fluid channel 955 defined by the body 930 of the structural member 925.

The battery pack 900 can include a plurality of battery cells 120. For example, the battery pack 900 can have a first battery cell 120 disposed in the bay 705. The first battery cell 120 can be disposed horizontally such that the top portion 305 is facing the first bay wall 910 and the bottom portion 310 is facing the second bay wall 915. The second battery cell 120 can be disposed horizontally such that the bottom portion 310 is facing the first bay wall 910 and the top portion 305 is facing the second bay wall 915. For example, the bottom portion 310 of the first battery cell 120 can be facing the bottom portion 310 of the second battery cell 120. The first battery cell 120 can be disposed on the first member side 935. The bottom portion 310 of the first battery cell 120 can face the first member side 935 and can interface with or couple with the first member side 935. The second battery cell 120 can be disposed on the second member side 940. The bottom portion 310 of the second battery cell 120 can face the second member side and can interface with or couple with the second member side 940.

The battery pack 900 can include at least one battery cell group 400. For example, at least one battery cell group 400 can be disposed on the first member side 935 of the structural member 925 and at least one battery cell group 400 can be disposed on the second member side 940 of the structural member 925. The battery cell group 400 can be oriented in the bay 705 of the battery pack 700 such that the battery cells 120 are disposed as described above. For example, a first battery cell group 400 can include a first set of battery cells 120 and a second battery cell group 400 can include a second set of battery cells 120. The first battery cell group 400 and the second battery cell group 400 can be oriented such that the bottom portions 310 of the first set and second set of battery cells 120 face each other. The battery cell group 400 can be disposed, at least partially, between the first flange 945 and the second flange 950. The battery cell group 400 can extend between the first flange 945 and the second flange 950.

The battery pack 900 can include at least one battery cell assembly 970. The battery cell assembly 970 can include a structural member 925, a first battery cell group 400 disposed on the first member side 935 of the structural member 925, and a second battery cell group 400 disposed on the second member side 940 of the structural member 925. A plurality of battery cell groups 400 can be disposed on at least one of the first member side 935 and the second member side 940 of the structural member 925. For example, a first set of battery cell groups 400 can be disposed on the first member side 935 and a second set of battery cell groups 400 can be disposed on the second member side 940. The battery pack 900 can include a plurality of battery cell assemblies 970. For example, a first battery cell assembly 970 can be disposed adjacent to a second battery cell assembly 970. The first battery cell assembly 970 can be spaced apart from the second battery cell assembly 970 to define a gap 975. For example, a top portion 305 of a first battery cell 120 of the first battery cell assembly 970 can face and be spaced apart from a top portion 305 of a second battery cell 120 of the second battery cell assembly 970. The gap 975 can facilitate venting of gases emitted by the battery cells 120.

Figure 10:
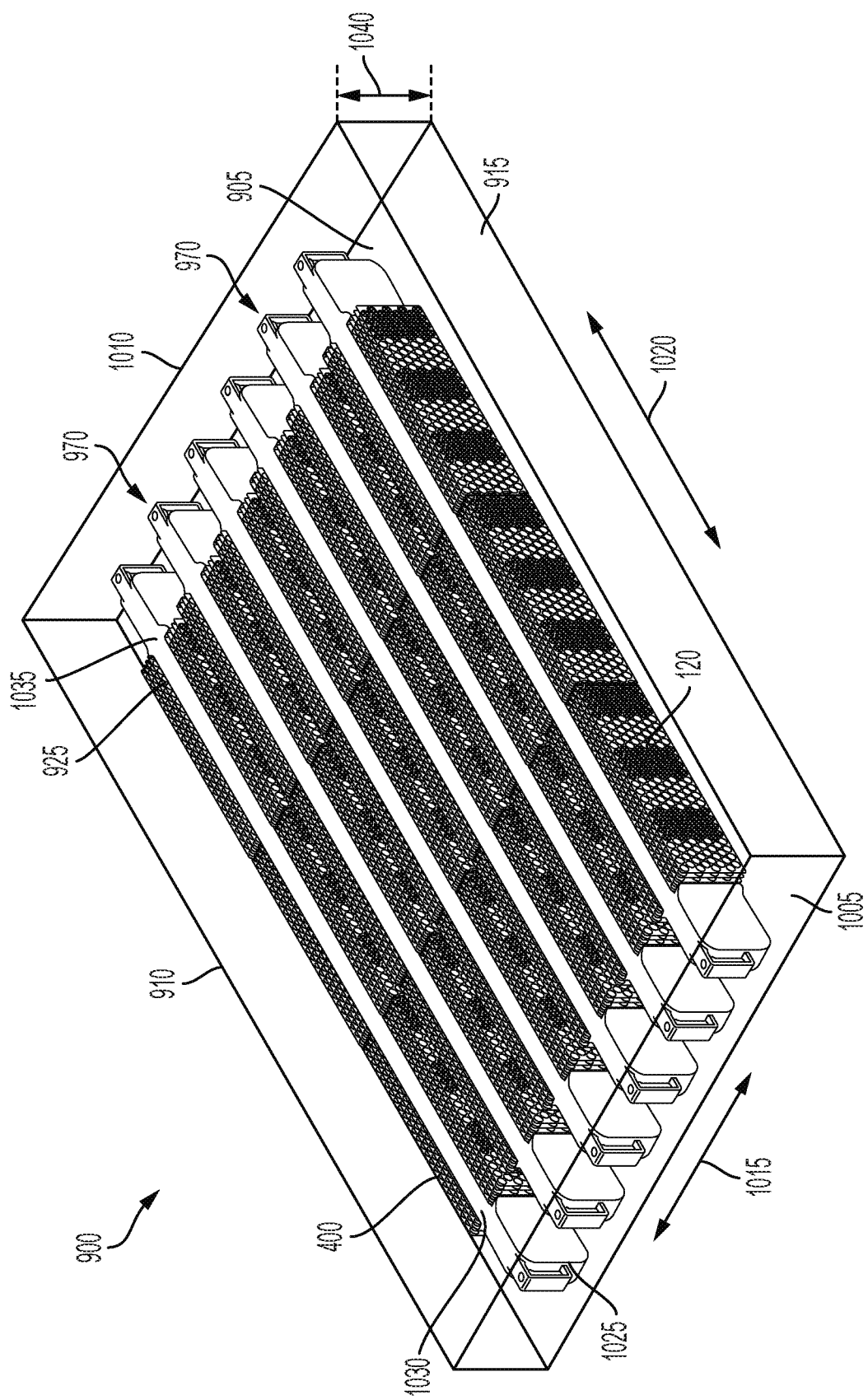
FIG. 10 depicts a perspective view of an example battery pack, in accordance with some aspects.

FIG. 10 depicts a top perspective view of battery pack 900. The battery pack 900 can have a first pack end 1005 and a second pack end 1010. The first pack end 1005 and the second pack end 1010 can extend between the first bay wall 910 and the second bay wall 915. The ends 1005, 1010 can extend in an axial direction 1015. The bay walls 910, 915 can extend in a longitudinal direction 1020. The structural member 925 can extend in the longitudinal direction 1020 within the battery pack 900. For example, the structural member 925 can be parallel with at least a portion of the first bay wall 910 or the second bay wall 915. The battery cells 120 can extend in the axial direction 1015. For example, the central axis 340 of the battery cell 120 can be parallel with at least a portion of the first pack end 1005 or the second pack end 1010 and the base 920 of the battery pack 900.

The structural member 925 can extend in the axial direction 1015 within the battery pack 900. For example, the structural member 925 can be parallel with at least a portion of the first pack end 1005 or the second pack end 1010 of the battery pack 900. The battery cell 120 can extend in the longitudinal direction 1020. For example, the central axis 340 of the battery cell 120 can be parallel with at least a portion of the first bay wall 910 or the second bay wall 915 and the base 920 of the battery pack 900.

The structural member 925 can have at least one header 1025. The header 1025 can provide fluid to or receive fluid from the fluid channel 955 of the structural member 925. For example, the structural member can have a first member end 1030 and a second member end 1035 disposed opposite the first member end 1030. The first member end 1030 can be disposed proximate to the first pack end 1005 of the battery pack 900. The second member end 1035 can be disposed proximate to the second pack end 1010. The fluid channel 955 can extend between the first member end 1030 and the second member end 1035. The header 1025 can be disposed at at least one of the first member end 1030 and the second member end 1035. For example, a first header 1025 can be coupled with or integral with the first member end 1030. The first header 1025 can couple with the first pack end 1005 of the battery pack 700. A second header 1025 can be coupled with or integral with the second member end 1035. The second header 1025 can couple with the second pack end 1010 of the battery pack 900. Fluid can flow in any direction between the first header 1025 and the second header 1025. For example, the fluid channel 955 can have any shape or have any number of sub-channels within the fluid channel 955 to accommodate any fluid flow path. For example, the fluid channel 955 can include a single path such that fluid can flow in a single direction from the first header 1025 to the second header 1025, or vice versa. The fluid channel 955 may have a serpentine shape such that the fluid can flow back and forth between the first member end 1030 and the second member end 1035 or between a top and a bottom of the structural member 925.

The battery pack 900 can include a plurality of battery cell assemblies 970. For example, the battery pack 900 can have a plurality of structural members 925. The structural member 925 can extend within the bay 905 in the longitudinal direction 1020. Each structural member 925 can have at least one first battery cell group 400 disposed on the first member side 935 and at least one second battery cell group 400 disposed on the second member side 940. A gap 975 can be defined between each adjacent battery cell assembly 970. The battery pack 900 can have any number of battery cell assemblies 970. For example, the battery pack 900 can have six battery cell assemblies 970. The number of battery cell assemblies 970 can be based on a width of the battery pack 900. For example, the battery cell assemblies 970 can fill a majority of the battery pack 900. A first outermost battery cell assembly 970 can be disposed adjacent to the first bay wall 910. The second outermost battery cell assembly 970 can be disposed adjacent to the second bay wall 915. A first gap 975 can be defined between the first outermost battery cell assembly 970 and the first bay wall 910 and a second gap 975 can be defined between the second outermost battery cell assembly 970 and the second bay wall 910.

The battery pack 900 can have a battery pack height 1040. The battery pack height 1040 can be based, at least partially, on the width 330 of the battery cells 120. The battery pack height 1040 can be based, at last partially, on the number of rows of battery cells 120. The battery pack height 1040 can be incrementally adjusted by an amount equal to or less than a width 330 of the battery cell 120. For example, to add an additional row of battery cells to a battery cell group 400, the battery pack height 1040 can increase by an amount less than the width 330 of the battery cell to accommodate the additional row. For example, since the additional battery cells 120 can be disposed, at least partially, in the recesses 655 defined by the adjacent row of battery cells 120, the additional height added by the new row of batter cells 120 is less than the width 330 of the battery cells 120.

Figure 11:
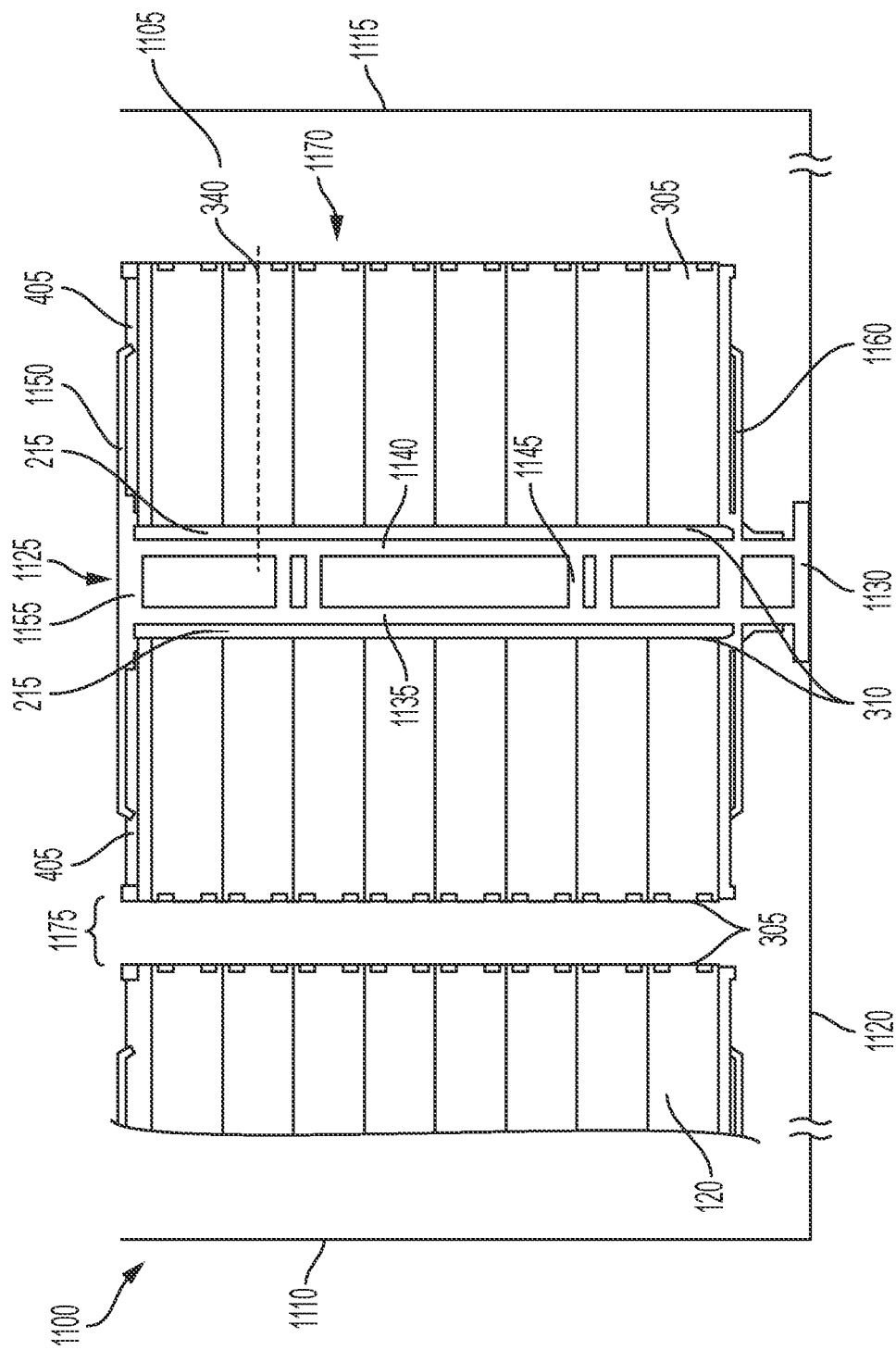
FIG. 11 depicts a cross-sectional view of a portion of an example battery pack, in accordance with some aspects.

FIG. 11 depicts a cross-sectional view of a portion of an example battery pack 1100. The battery pack 1100 can be or include battery pack 110. The battery pack 1100 can include a bay 1105. The bay 1105 can receive or retain various components of the battery pack 1100. The bay 1105 can have a first bay wall 1110 and a second bay wall 1115. The first bay wall 1110 can be disposed opposite the second bay wall 1115. The first bay wall 1110 and the second bay wall 1115 can be sidewalls of the battery pack 1100. The bay 1105 can have a base 1120. The first bay wall 1110 and the second bay wall 1115 can extend from the base 1120. For example, at least one of the first bay wall 1110 and the second bay wall 1115 can extend perpendicular from the base 1120. The base 1120 can define a bottom surface of the battery pack 1100.

The battery pack 1100 can include at least one structural member 1125. The structural member 1125 can absorb and disperse forces exerted on the battery pack 900 such that battery cells 120 disposed in the battery pack 1100 receive less of the force. The structural member 1125 can be any material that can retain the desired shaped and perform the functions described herein. For example, the structural member 1125 can be made of a plastic or a metal. The structural member 1125 can be disposed in the bay 1105. For example, the structural member 1125 can be disposed between the first bay wall 1110 and the second bay wall 1115. The structural member 1125 can interface with or couple with the base 1120 of the battery pack 1100. The structural member 1125 can have a rectangular shape that extends away from the base 1120. The structural member 1125 can have at least one member base 1130. The member base 1130 can interface with or couple with the base 1120. The structural member 1125 can have a first member wall 1135 and a second member wall 1140. The first member wall 1135 and the second member wall 1140 can extend from the member base 1130. For example, the first member wall 1135 and the second member wall 1140 can extend vertically from the member base 1130. The member base 1130 can be wider than a distance between the first member wall 1135 and the second member wall 1140. The structural member 1125 can have at least one support member 1145. The support member 1145 can extend between the first member wall 1135 and the second member wall 1140. The support member 1145 can provide additional strength and support to the structural member 1125.

The battery pack 1100 can include at least one battery cell 120. The battery cell 120 can be disposed in the bay 1105. For example, the battery cell 120 can be disposed between the first bay wall 1110 and the second bay wall 1115. The battery cell 120 can be disposed horizontally within the battery pack 1100. For example, a top portion 305 and a bottom portion 310 can face opposite bay walls 1110, 1115 of the battery pack 1100. For example, the top portion 305 of the battery cell 120 can face at least one of the first bay wall 1110 and the second bay wall 1115. The bottom portion 310 of the battery cell 120 can face the other one of the at least one of the first bay wall 1110 and the second bay wall 1115. The battery cell 120 can be parallel with the base 1120 of the battery pack 1100. For example, the central axis 340 of the battery cell 120 can be parallel with at least a portion of the base 1120 of the battery pack 1100.

The battery cell 120 can be disposed adjacent to the structural member 1125. The bottom portion 310 of the battery cell 120 can be disposed adjacent to and face the structural member 1125. For example, the bottom portion 310 of the battery cell 120 can be adjacent to one of the first member wall 1135 and the second member wall 1140 of the structural member 1125. The top portion 305 of the battery cell 120 can be disposed away from the first member wall 1135 or the second member wall 1140.

The battery pack 1100 can include a plurality of battery cells 120. For example, the battery pack 1100 can include a first battery cell 120 disposed in the bay 1105. The first battery cell 120 can be disposed horizontally such that the top portion 305 is facing the first bay wall 1110 and the bottom portion 310 is facing the second bay wall 1115. The second battery cell 120 can be disposed horizontally such that the bottom portion 310 is facing the first bay wall 1110 and the top portion 305 is facing the second bay wall 1115. For example, the bottom portion 310 of the first battery cell 120 can be facing the bottom portion 310 of the second battery cell 120. The first battery cell 120 can be disposed on the first member wall 1135. The bottom portion 310 of the first battery cell 120 can face the first member wall 1135. The second battery cell 120 can be disposed on the second member wall 1140. The bottom portion 310 of the second battery cell 120 can face the second member side.

The battery pack 1100 can include at least one thermal component 215 (e.g., a cold plate). For example, a first thermal component 215 can be disposed along the first member wall 1135. A second thermal component 215 can be disposed along the second member wall 1140. The first thermal component 215 can be disposed between the first member wall 1135 and a bottom portion 310 of a first battery cell 120. The second thermal component 215 can be disposed between the second member wall 1140 and a bottom portion 310 of a second battery cell 120. The bottom portions 310 of the battery cells 120 can interface with or couple with the thermal components 215. For example, the bottom portion 310 can be coupled with the thermal component 215 via an adhesive.

The battery pack 1100 can include at least one battery cell group 400. For example, at least one battery cell group 400 can be disposed on the first member wall 1135 of the structural member 1125 and at least one battery cell group 400 can be disposed on the second member wall 1140 of the structural member 1125. The battery cell group 400 can be oriented in the bay 1105 of the battery pack 1100 such that the battery cells 120 are disposed as described above. For example, a first battery cell group 400 can include a first set of battery cells 120 and a second battery cell group 400 can include a second set of battery cells 120. The first battery cell group 400 and the second battery cell group 400 can be oriented such that the bottom portions 310 of the first set and second set of battery cells 120 face each other.

The battery cell group 400 can be coupled with the structural member 1125 via at least one plate 1150. The plate 1150 can be a shear plate. The plate 1150 can reduce the amount of load applied to the battery cells 120 when the battery pack 1100 experiences an external load. The plate 1150 can couple with the structural member 1125 and the battery cell case 405 of the battery cell group 400. For example, the plate 1150 can be coupled with a top 1155 of the structural member 1125 via a mechanical fastener (e.g., bolt, screw, clamp, etc.) or an adhesive, among others. The top 1155 of the structural member 1125 can be opposite the member base 1130. The plate 1150 can be coupled with a top of the battery cell case 405 via a mechanical fastener or an adhesive, among others. The plate 1150 can position the battery cell groups 400 such that the bottom portions 310 of the plurality of battery cells 120 can interface with or couple with a thermal component 215 of the battery pack 1100.

The battery pack 1100 can include a second plate, shown as base plate 1160. The base plate 1160 can be coupled with or be integral with the structural member 1125. For example, the base plate 1160 can extend away from the structural member 1125. The base plate 1160 can interface with or couple with a bottom of the battery cell case 405. For example, the base plate 1160 can support the battery cell group 400. The battery cell group 400 can be disposed, at least partially between the base plate 1160 and the plate 1150.

The battery pack 1100 can include at least one battery cell assembly 1170. The battery cell assembly 1170 can include, for example, a structural member 1125, a first thermal component 215 disposed on the first member wall 1135, a first battery cell group 400 disposed on the first member wall 1135 of the structural member 1125 via the first thermal component 215 (e.g., the first thermal component 215 can be disposed between the first battery cell group 400 and the first member wall 1135), a second thermal component 215 disposed on the second member wall 1140, a second battery cell group 400 disposed on the second member wall 1140 of the structural member 1125 via the second thermal component 215 (e.g., the second thermal component 215 can be disposed between the second battery cell group 400 and the second member wall 1140), and a plate 1150 coupled with the structural member 1125 and the first and second battery cell groups 400. The battery cell assembly 1170 can include a plurality of battery cell groups 400 disposed on at least one of the first member wall 1135 and the second member wall 1140 of the structural member 1125. For example, a first set of battery cell groups 400 can be disposed on the first member wall 1135 and a second set of battery cell groups 400 can be disposed on the second member wall 1140. The battery pack 1100 can include a plurality of battery cell assemblies 1170. For example, a first battery cell assembly 1170 can be disposed adjacent to a second battery cell assembly 1170. The first battery cell assembly 1170 can be spaced apart from the second battery cell assembly 1170 to define a gap 1175. For example, a top portion 305 of a first battery cell 120 of the first battery cell assembly 1170 can face and be spaced apart from a top portion 305 of a second battery cell 120 of the second battery cell assembly 970. The gap 1175 can facilitate venting of gases emitted by the battery cells 120.

Figure 12:
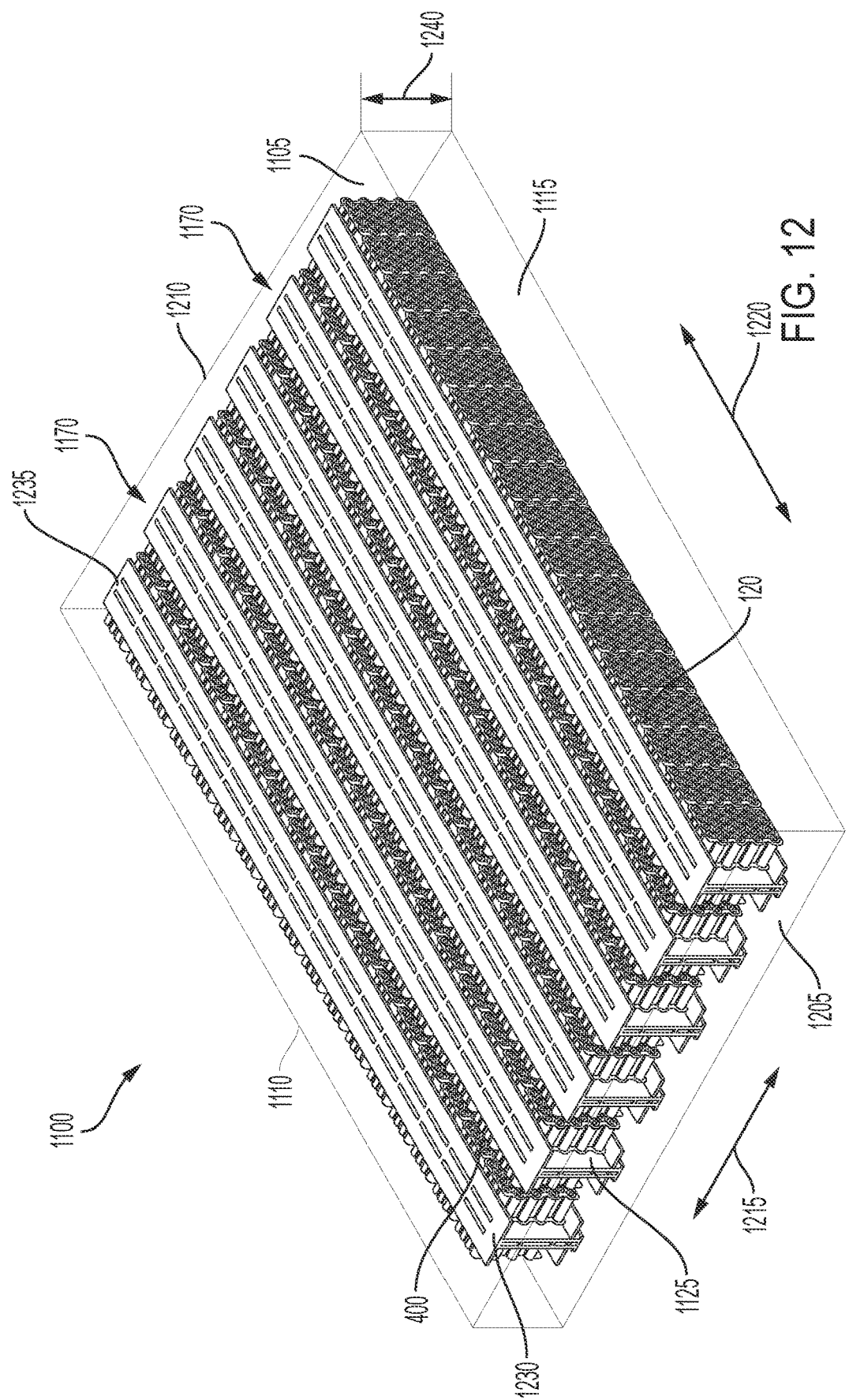
FIG. 12 depicts a perspective view of an example battery pack, in accordance with some aspects.

FIG. 12 depicts a top perspective view of battery pack 1100. The battery pack 1100 can have a first pack end 1205 and a second pack end 1210. The first pack end 1205 and the second pack end 1210 can extend between the first bay wall 1110 and the second bay wall 1115. The ends 1205, 1210 can extend in an axial direction 1215. The bay walls 1110, 1115 can extend in a longitudinal direction 1220. The structural member 1125 can extend in the longitudinal direction 1220 within the battery pack 1100. For example, the structural member 1125 can be parallel with at least a portion of the first bay wall 1110 or the second bay wall 1115. The battery cells 120 can extend in the axial direction 1215. For example, the central axis 340 of the battery cell 120 can be parallel with at least a portion of the first pack end 1205 or the second pack end 1210 and the base 1120 of the battery pack 1100.

The structural member 1125 can extend in the axial direction 1215 within the battery pack 1100. For example, the structural member 1125 can be parallel with at least a portion of the first pack end 1205 or the second pack end 1210 of the battery pack 1100. The battery cell 120 can extend in the longitudinal direction 1220. For example, the central axis 340 of the battery cell 120 can be parallel with at least a portion of the first bay wall 1110 or the second bay wall 1115 and the base 1120 of the battery pack 1100.

The battery pack 1100 can include a plurality of battery cell assemblies 1170. For example, the battery pack 1100 can have a plurality of structural members 1125. The structural member 1125 can extend within the bay 1105 in the longitudinal direction 1020. Each structural member 1125 can have at least one first battery cell group 400 disposed on the first member wall 1135 and at least one second battery cell group 400 disposed on the second member wall 1140. A gap 1175 can be defined between each adjacent battery cell assembly 1170. The battery pack 1100 can have any number of battery cell assemblies 1170. For example, the battery pack 1100 can have six battery cell assemblies 1170. The number of battery cell assemblies 1170 can be based on a width of the battery pack 1100. For example, the battery cell assemblies 1170 can fill a majority of the battery pack 1100. A first outermost battery cell assembly 1170 can be disposed adjacent to the first bay wall 1110. The second outermost battery cell assembly 1170 can be disposed adjacent to the second bay wall 1115. A first gap 1175 can be defined between the first outermost battery cell assembly 1170 and the first bay wall 1110 and a second gap 1175 can be defined between the second outermost battery cell assembly 1170 and the second bay wall 1110.

The structural member 1125 can extend beyond the battery cell group(s) 400. For example, a portion of the structural member 1125 can extend beyond the battery cell group(s) 400 such that the thermal component 215 can be accessed at an end of the structural member 1125

The battery pack 1100 can have a battery pack height 1240. The battery pack height 1240 can be based, at least partially, on the width 330 of the battery cells 120. The battery pack height 1240 can be based, at last partially, on the number of rows of battery cells 120. The battery pack height 1240 can be incrementally adjusted by an amount equal to or less than a width 330 of the battery cell 120. For example, to add an additional row of battery cells to a battery cell group 400, the battery pack height 1240 can increase by an amount less than the width 330 of the battery cell to accommodate the additional row. For example, since the additional battery cells 120 can be disposed, at least partially, in the recesses 655 defined by the adjacent row of battery cells 120, the additional height added by the new row of batter cells 120 is less than the width 330 of the battery cells 120.

Figure 13:
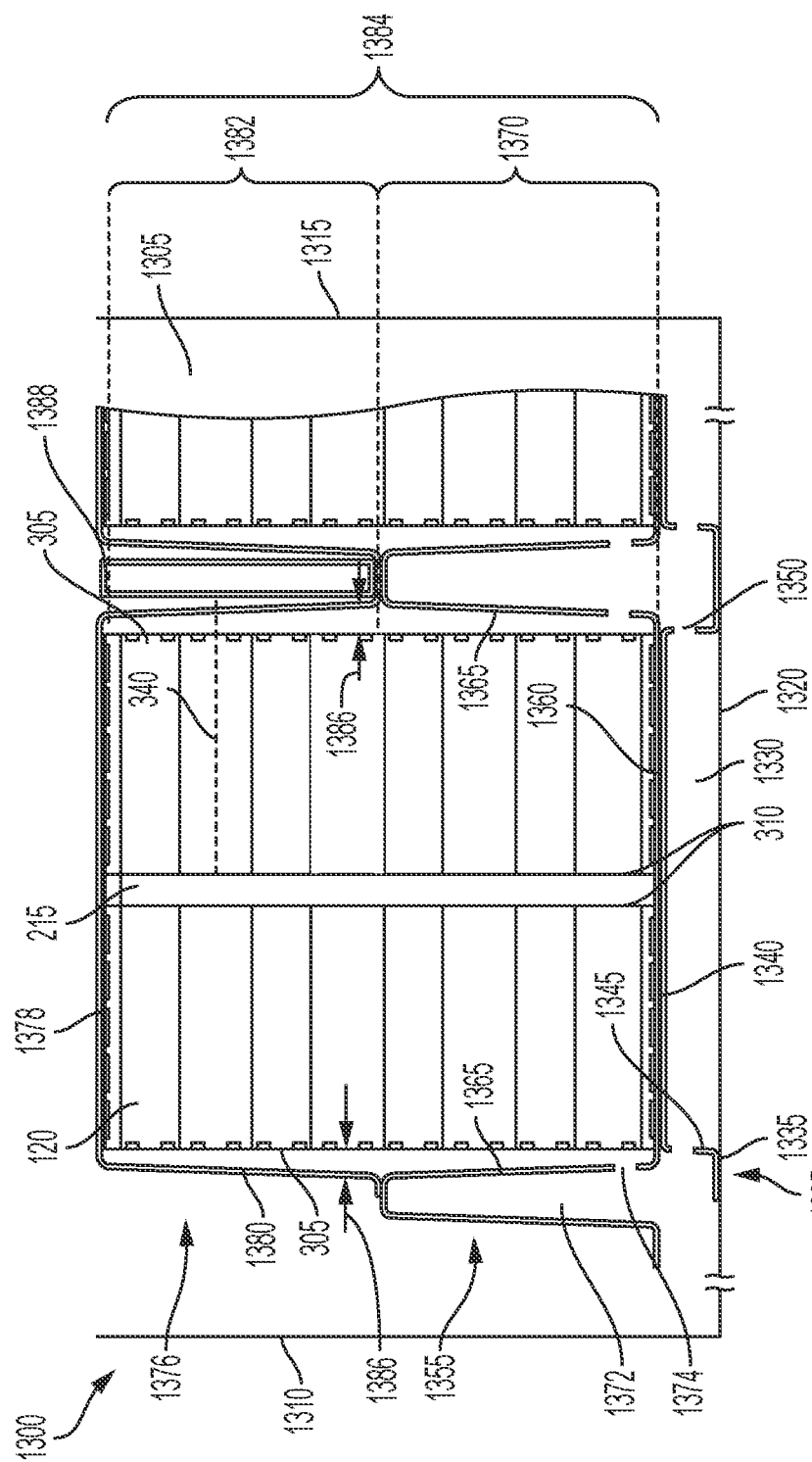
FIG. 13 depicts a cross-sectional view of a portion of an example battery pack, in accordance with some aspects.

FIG. 13 depicts a cross-sectional view of a portion of an example battery pack 1300. The battery pack 1300 can be or include battery pack 110. The battery pack 1300 can include a bay 1305. The bay 1305 can receive or retain various components of the battery pack 1300. The bay 1305 can have a first bay wall 1310 and a second bay wall 1315. The first bay wall 1310 can be disposed opposite the second bay wall 1315. The first bay wall 1310 and the second bay wall 1315 can be sidewalls of the battery pack 1300. The bay 1305 can have a base 1320. The first bay wall 1310 and the second bay wall 1315 can extend from the base 1320. For example, at least one of the first bay wall 1310 and the second bay wall 1315 can extend perpendicular from the base 1320. The base 1320 can define a bottom surface of the battery pack 1300.

The battery pack 1300 can include at least one structural member. A first structural member can be a vent member 1325. The vent member 1325 can support the battery cells 120 that are disposed in the battery pack 1300. The vent member 1325 can be any material that can retain the desired shaped and perform the functions described herein. For example, the structural member 1325 can be made of a plastic or a metal. The vent member 1325 can define a vent chamber 1330. The vent chamber 1330 can provide a path for gases emitted by battery cells 120 to flow to facilitate venting of the battery pack 1300. The vent member 1325 can have at least one lower portion 1335 that can extend along the base 1320 of the battery pack 1300. The vent member 1325 can have at least one elevated portion 1340 that can be disposed away from the base 1320. The vent member 1325 can have at least one chamber wall 1345 that can extend between the lower portion 1335 and the elevated portion 1340. The chamber wall 1345 can have at least one chamber wall opening 1350. The chamber wall opening 1350 can provide a path for gases to enter the vent chamber 1330.

The battery pack 1300 can include a second structural member, shown as base member 1355. The base member 1355 can be any material that can retain the desired shaped and perform the functions described herein. For example, the structural member 1355 can be made of a plastic or a metal. The base member 1355 can have at least one base portion 1360. The base portion 1360 can extend along the elevated portion 1340 of the vent member 1325. For example, the base portion 1360 can interface with or couple with the elevated portion 1340. The base member 1355 can have at least one lower wall portion 1365. The lower wall portion 1365 can extend from the base portion 1360 in a direction away from the vent member 1325. The lower wall portion 1365 can be disposed above the lower portion 1335 of the vent member 1325. The base member 1355 can include a first lower wall portion 1365 spaced away from a second lower wall portion 1365. The base portion 1360, the first lower wall portion 1365, and the second lower wall portion 1365 can define a base pocket 1370. The base pocket 1370 can receive a plurality of battery cells 120. The lower wall portion 1365 can be at least partially hallow. For example, the lower wall portion 1365 and the chamber wall 1345 of the vent member 1325 can define a lower wall cavity 1372. The lower wall portion 1365 can have at least one lower wall opening 1374. The lower wall opening 1374 can provide a path for gases to enter the lower wall cavity 1372 from the base pocket 1370.

The battery pack 1300 can include a third structural member, shown as cover member 1376. The structural member 1376 can be any material that can retain the desired shaped and perform the functions described herein. For example, the structural member 1376 can be made of a plastic or a metal. The cover member 1376 can be disposed above the base member 1355. The cover member 1376 can include at least one top portion 1378. The top portion 1378 can be disposed opposite the base portion 1360. The cover member 1376 can include at least one upper wall portion 1380. The upper wall portion 1380 can extend from the top portion 1378 in a direction toward the vent member 1325. The upper wall portion 1380 can interface with or couple with the lower wall portion 1365. For example, a bottom of the upper wall portion 1380 can interface with a top of the lower wall portion 1365. The cover member 1376 can include a first upper wall portion 1380 spaced away from a second upper wall portion 1380. The top portion 1378, the first upper wall portion 1380, and the second upper wall portion 1380 can define a cover pocket 1382. The cover pocket 1382 can align with the base pocket 1370 to create a cavity 1384.

The battery pack 1300 can include at least one battery cell 120. The battery cell 120 can be disposed in the bay 1305. For example, the battery cell 120 can be disposed between the first bay wall 1310 and the second bay wall 1315. The battery cell 120 can be disposed horizontally within the battery pack 1300. For example, a top portion 305 and a bottom portion 310 can face opposite bay walls 1310, 1315 of the battery pack 1100. For example, the top portion 305 of the battery cell 120 can face at least one of the first bay wall 1310 and the second bay wall 1315. The bottom portion 310 of the battery cell 120 can face the other one of the at least one of the first bay wall 1310 and the second bay wall 1315. The battery cell 120 can be parallel with the base 1320 of the battery pack 1300. For example, the central axis 340 of the battery cell 120 can be parallel with at least a portion of the base 1320 of the battery pack 1300.

The battery pack 1300 can include a plurality of battery cells 120. For example, a plurality of battery cells 120 can be disposed in the cavity 1384. For example, a first battery cell 120 can be disposed horizontally in the cavity 1384. The first battery cell 120 can be disposed adjacent to at least one of the first lower wall portion 1365 and a first upper wall portion 1380. A top portion 305 of the first battery cell 120 can face the at least one of the first lower wall portion 1365 and the first upper wall portion 1380. A second battery cell 120 can be disposed horizontally in the cavity 1384. The second battery cell 120 can be disposed adjacent to at least one of the second lower wall portion 1365 and the second upper wall portion 1380 such that a top portion 305 of the second battery cell 120 faces the second lower wall portion 1365 or the second upper wall portion 1380. For example, the first battery cell 120 is facing an opposite direction than the second battery cell 120.

The battery pack 1300 can include at least one thermal component 215. For example, a thermal component 215 can be disposed in the cavity 1384 and disposed between the first battery cell 120 and the second battery cell 120. The bottom portion 310 of both the first and second battery cell 120 can interface with or couple with the thermal component 215. A top portion 305 of the first and second battery cells 120 can be spaced apart from the respective wall portions to define a gap 1386. For example, the gap 1386 can be between the top portion 305 of the first battery cell 120 and the first lower wall portion 1365 or the first upper wall portion 1380. The gap 1386 can be between the top portion 305 of the second battery cell 120 and the second lower wall portion 1365 or between the top portion 305 of the second battery cell 120 and the second upper wall portion 1380.

The battery pack 1300 can include at least one battery cell group 400. For example, at least one battery cell group 400 can be disposed on a first side of the thermal component 215 and at least one battery cell group 400 can be disposed on a second side of the thermal component 215. A plurality of battery cell groups 400 can be disposed on at least one of the first side and the second side of the thermal component 215. For example, a first set of battery cell groups 400 can be disposed on the first side and a second set of battery cell groups 400 can be disposed on the second side. The battery cell group 400 can be oriented in the bay 1105 of the battery pack 1100 such that the battery cells 120 are disposed as described above. For example, a first battery cell group 400 can include a first set of battery cells 120 and a second battery cell group 400 can include a second set of battery cells 120. The first battery cell group 400 and the second battery cell group 400 can be oriented such that the bottom portions 310 of the first set and second set of battery cells 120 face each other.

The base member 1355 can be coupled with the cover member 1376. For example, the base member 1355 can be coupled with the cover member 1376 via a mechanical fastener (e.g., bolt, nail, screw, clamp, etc.) or an adhesive, among others. The base member 1355 can be clamped together with the cover member 1376. For example, a structural component 1388 can be disposed in the upper wall portion 1380 of the cover member 1376. The structural component 1388 can apply a force to the upper wall portion 1380 to press the upper wall portion 1380 again the lower wall portion 1365.

Figure 14:
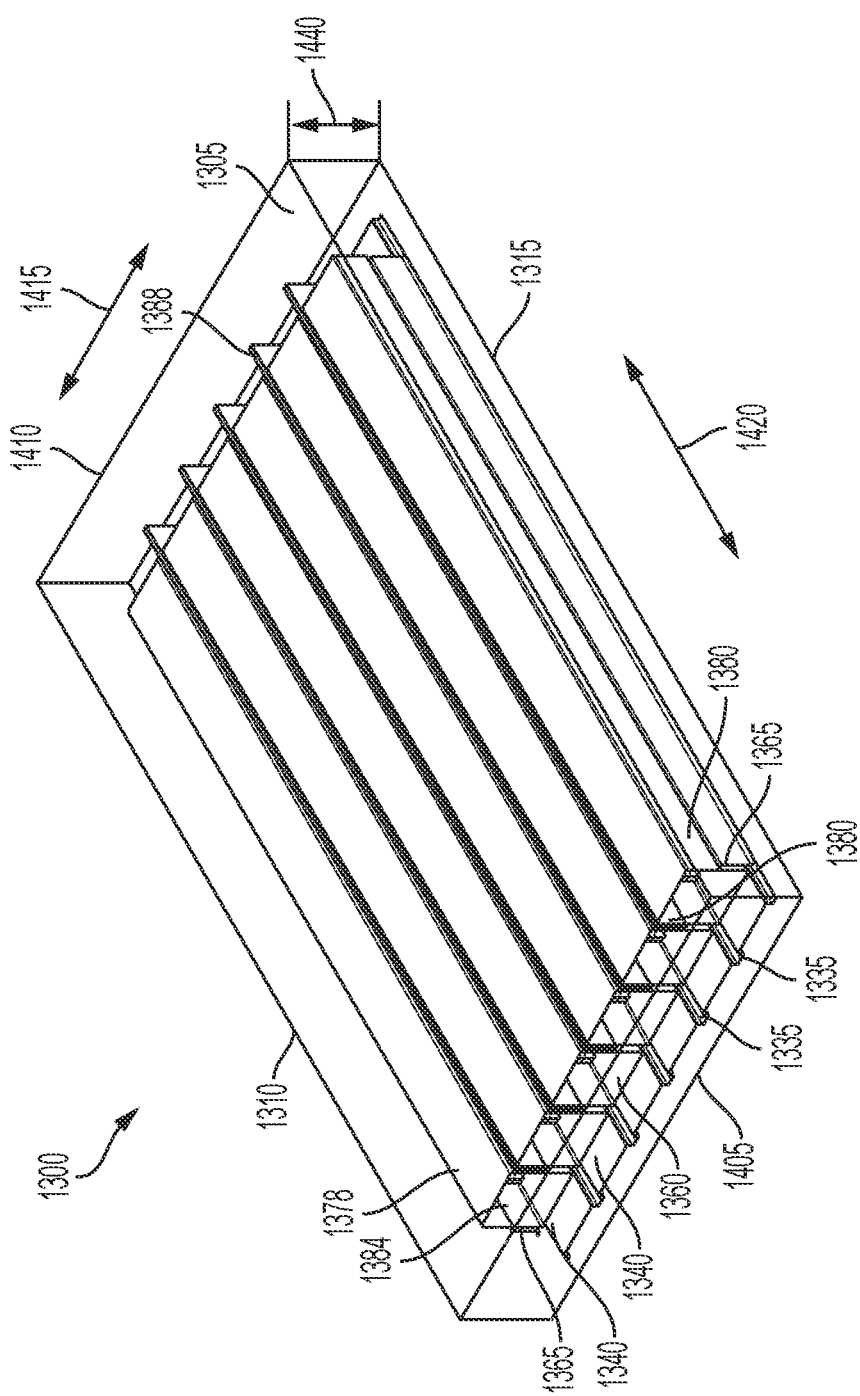
FIG. 14 depicts a perspective view of an example battery pack, in accordance with some aspects.

FIG. 14 depicts a top perspective view of battery pack 1300. The battery pack 1300 can have a first pack end 1405 and a second pack end 1410. The first pack end 1405 and the second pack end 1410 can extend between the first bay wall 1310 and the second bay wall 1315. The ends 1405, 1410 can extend in an axial direction 1415. The bay walls 1310, 1315 can extend in a longitudinal direction 1420. The structural members 1325, 1355, 1376 can extend in the longitudinal direction 1420 within the battery pack 1300. For example, the structural members 1325, 1355, 1376 can be parallel with at least a portion of the first bay wall 1310 or the second bay wall 1315. The battery cells 120 can extend in the axial direction 1415. For example, the central axis 340 of the battery cell 120 can be parallel with at least a portion of the first pack end 1405 or the second pack end 1410 and the base 1320 of the battery pack 1300.

The structural members 1325, 1355, 1376 can extend in the axial direction 1415 within the battery pack 1300. For example, the structural members 1325, 1355, 1376 can be parallel with at least a portion of the first pack end 1405 or the second pack end 1410 of the battery pack 1300. The battery cell 120 can extend in the longitudinal direction 1420. For example, the central axis 340 of the battery cell 120 can be parallel with at least a portion of the first bay wall 1310 or the second bay wall 1315 and the base 1320 of the battery pack 1300.

The structural member 1325, 1355, 1376 can extend along a length of the battery pack 1300. The vent member 1325 can extend longer than the base member 1355 and the cover member 1376. The base member 1355 and the cover member 1376 can extend substantially the same distance. The base member 1355 and the cover member 1376 can extend longer than the plurality of battery cells 120.

The battery pack 1300 can include a plurality of vent members 1325. For example, a first vent member 1325 can be disposed adjacent to a second vent member 1325. The battery pack 1300 can include a single vent member 1325 with a plurality of lower portions 1335, elevated portions 1340, and chamber walls 1345. The battery pack 1300 can include a plurality of base members 1355. For example a first base member 1355 can be disposed adjacent to a second base member 1355. The battery pack 1300 can include a single base member 1355 with a plurality of base portions 1360 and a plurality of lower wall portions 1365. The battery pack 1300 can include a plurality of cover members 1376. For example, a first cover member 1376 can be disposed adjacent to a second cover member 1376. The battery pack 1300 can include a single cover member 1376 with a plurality of top portions 1378 and upper wall portions 1380.

The battery pack 1300 can have a battery pack height 1440. The battery pack height 1440 can be based, at least partially, on the width 330 of the battery cells 120. The battery pack height 1440 can be based, at last partially, on the number of rows of battery cells 120. The battery pack height 1440 can be incrementally adjusted by an amount equal to or less than a width 330 of the battery cell 120. For example, to add an additional row of battery cells to a battery cell group 400, the battery pack height 1440 can increase by an amount less than the width 330 of the battery cell to accommodate the additional row. For example, since the additional battery cells 120 can be disposed, at least partially, in the recesses 655 defined by the adjacent row of battery cells 120, the additional height added by the new row of batter cells 120 is less than the width 330 of the battery cells 120.

Figure 15:
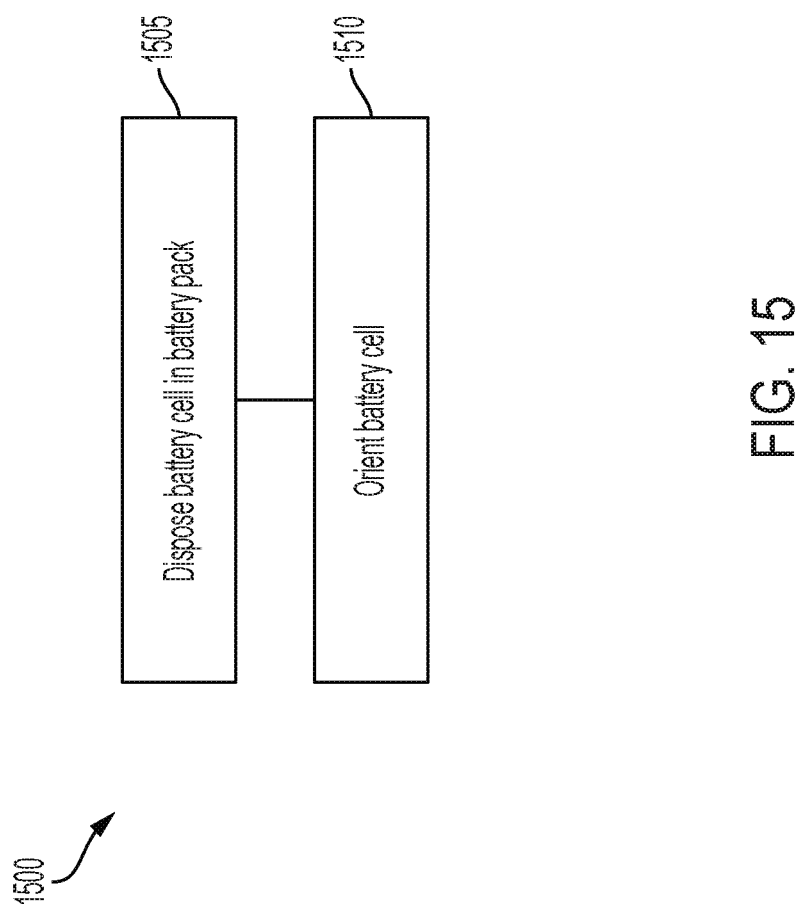
FIG. 15 depicts a flow diagram illustrating an example method to assemble a battery pack, in accordance with some aspects.

FIG. 15 depicts an example method 1500 for assembling a battery pack. The method 1500 can be applied to any of battery packs 700, 900, 1100, or 1300. Method 1500 can include disposing a battery cell 120 in the battery pack 700, 900, 1100, 1300 (Act 1505) and orienting the battery cell 120 within the battery pack 700, 900, 1100, 1300 (Act 1510).

With reference to battery pack 700, Act 1505 of disposing a battery cell 120 in a battery pack 700 can include disposing the battery cell 120 in the bay 705 of the battery pack 700. Act 1505 can include disposing a plurality of battery cells 120 in the bay 705. For example, a first battery cell 120 and a second battery cell 120 can be disposed in the bay 705. The battery cells 120 can be a part of at least one battery cell group 400. For example, the battery cell group 400 can include a plurality of battery cells 120. The battery cell group 400 can arrange the plurality of battery cells 120 in various rows (e.g., rows A-H 605-640). The battery cell group 400 can define any number of rows of battery cells 120.

Act 1505 can include disposing a structural member 725 in the bay 705. For example, the structural member 725 can be disposed in the bay 705 such that the structural member 725 is parallel with at least one of the first bay wall 710 or the second bay wall 715. The structural member 725 can extend in a longitudinal direction 820 within the bay 705. A plurality of structural members 725 can be disposed in the bay 705.

Act 1505 can include disposing a thermal component 215 in the bay 705. For example, the thermal component 215 can be disposed between the first battery cell 120 (or a first battery cell group 400) and the second battery cell 120 (or a second battery cell group 400).

Act 1510 of orienting the battery cell 120 can include orienting the battery cell 120 horizontally within the battery pack 700. For example, a top portion 305 of the battery cell 120 can face the first bay wall 710 and a bottom portion 310 of the battery cell 120 can face the second bay wall 715. A central axis 340 of the battery cell 120 can extend in the axial direction 815 in the battery pack 700. For example, with the battery pack 700 disposed in an electric vehicle 105, the central axis 340 can be parallel with a floor 155 of the electric vehicle 105. A plurality of battery cells 120 can be oriented horizontally within the battery pack 700. For example, a top portion 305 of a first battery cell 120 can face the first bay wall 710 and a top portion 305 of a second battery cell 120 can face the second bay wall 715 such that a bottom portion 310 of the first battery cell 120 faces and is adjacent to a bottom portion 310 of the second battery cell 120. A central axis 340 of the first battery cell 120 can be aligned with a central axis 340 of the second battery cell 120. The thermal component 215 can be disposed between the bottom portion 310 of the first battery cell 120 and the bottom portion 310 of the second battery cell 120.

Act 1510 can include coupling the structural member 725 with one or more battery cells 120. For example, a first battery cell 120 can be disposed adjacent to a first outer wall 735 and a second battery cell 120 can be disposed away from the first outer wall 735 such that the first battery cell 120 can be disposed between the second battery cell 120 and the first outer wall 735. The first battery cell 120 can be coupled with the structural member 725. Act 1510 can include interfacing or coupling the battery cells 120 with the thermal component 215. For example, the bottom portion 310 of the first and second battery cells 120 can interface with or couple with the thermal component 215.

With reference to battery pack 900, Act 1505 of disposing a battery cell 120 in a battery pack 900 can include disposing the battery cell 120 in the bay 905 of the battery pack 900. Act 1505 can include disposing a plurality of battery cells 120 in the bay 905. For example, a first battery cell 120 and a second battery cell 120 can be disposed in the bay 905. The battery cells 120 can be a part of at least one battery cell group 400. For example, the battery cell group 400 can include a plurality of battery cells 120. The battery cell group 400 can arrange the plurality of battery cells 120 in various rows (e.g., rows A-H 605-640). The battery cell group 400 can define any number of rows of battery cells 120.

Act 1505 can include disposing a structural member 925 in the bay 905. For example, the structural member 925 can be disposed in the bay 905 such that the structural member 925 is parallel with at least one of the first bay wall 910 or the second bay wall 915. The structural member 925 can extend in a longitudinal direction 1020 within the bay 905. A plurality of structural members 925 can be disposed in the bay 905.

Act 1505 can include disposing a thermal component 215 in the bay 905. For example, the thermal component 215 can be the fluid channel 955 of the structural member 925. The fluid channel 955 can be disposed between the first battery cell 120 (or a first battery cell group 400) and the second battery cell 120 (or a second battery cell group 400).

Act 1510 of orienting the battery cell 120 can include orienting the battery cell 120 horizontally within the battery pack 900. For example, a top portion 305 of the battery cell 120 can face the first bay wall 910 and a bottom portion 310 of the battery cell 120 can face the second bay wall 915. A central axis 340 of the battery cell 120 can extend in the axial direction 1015 in the battery pack 900. For example, with the battery pack 900 disposed in an electric vehicle 105, the central axis 340 can be parallel with a bottom surface 155 of the electric vehicle 105. A plurality of battery cells 120 can be oriented horizontally within the battery pack 900. For example, a top portion 305 of a first battery cell 120 can face the first bay wall 910 and a top portion 305 of a second battery cell 120 can face the second bay wall 915 such that a bottom portion 310 of the first battery cell 120 faces a bottom portion 310 of the second battery cell 120. A central axis 340 of the first battery cell 120 can be aligned with a central axis 340 of the second battery cell 120. The fluid channel 255 can be disposed between the bottom portion 310 of the first battery cell 120 and the bottom portion 310 of the second battery cell 120.

Act 1510 can include coupling the structural member 925 with one or more battery cells 120. For example, a first battery cell 120 can be disposed adjacent to a first outer wall 935 and a second battery cell 120 can be disposed adjacent to a second outer wall 940 such that the structural member 925 can be disposed between the first battery cell 120 and the second battery cell 120. The first battery cell 120 can be coupled with the first outer wall 935 of the structural member 725 and the second battery cell 120 can be coupled with the second outer wall 940 of the structural member 925.

With reference to battery pack 1100, Act 1505 of disposing a battery cell 120 in a battery pack 1100 can include disposing the battery cell 120 in the bay 1105 of the battery pack 1100. Act 1505 can include disposing a plurality of battery cells 120 in the bay 1105. For example, a first battery cell 120 and a second battery cell 120 can be disposed in the bay 1105. The battery cells 120 can be a part of at least one battery cell group 400. For example, the battery cell group 400 can include a plurality of battery cells 120. The battery cell group 400 can arrange the plurality of battery cells 120 in various rows (e.g., rows A-H 605-640). The battery cell group 400 can define any number of rows of battery cells 120.

Act 1505 can include disposing a structural member 1125 in the bay 1105. For example, the structural member 1125 can be disposed in the bay 1105 such that the structural member 1125 is parallel with at least one of the first bay wall 1110 or the second bay wall 1115. The structural member 1125 can extend in a longitudinal direction 1220 within the bay 1105. A plurality of structural members 1125 can be disposed in the bay 1105.

Act 1505 can include disposing a thermal component 215 in the bay 1105. For example, a first thermal component 215 can be disposed between the first battery cell 120 (or a first battery cell group 400) and a first outer wall 1135 of the structural member 1125 and a second thermal component 215 can be disposed between the second battery cell 120 (or a second battery cell group 400) and a second outer wall 1140 of the structural member 1125.

Act 1510 of orienting the battery cell 120 can include orienting the battery cell 120 horizontally within the battery pack 1100. For example, a top portion 305 of the battery cell 120 can face the first bay wall 1110 and a bottom portion 310 of the battery cell 120 can face the second bay wall 1115. A central axis 340 of the battery cell 120 can extend in the axial direction 1215 in the battery pack 1100. For example, with the battery pack 1100 disposed in an electric vehicle 105, the central axis 340 can be parallel with a bottom surface 155 of the electric vehicle 105. A plurality of battery cells 120 can be oriented horizontally within the battery pack 100. For example, a top portion 305 of a first battery cell 120 can face the first bay wall 1110 and a top portion 305 of a second battery cell 120 can face the second bay wall 1115 such that the bottom portion 310 of the first battery cell 120 faces the bottom portion 310 of the second battery cell 120. A central axis 340 of the first battery cell 120 can be aligned with a central axis 340 of the second battery cell 120. The structural member 1125 can be disposed between the bottom portion 310 of the first battery cell 120 and the bottom portion 310 of the second battery cell 120. A first thermal component 215 can be disposed between a first member wall 1135 of the structural member 1125 and the bottom portion 310 of the first battery cell 120 and a second thermal component 215 can be disposed between a second member wall 1135 of the structural member 1125 and the bottom portion 310 of the second battery cell 120.

Act 1510 can include coupling the structural member 1125 with one or more battery cells 120. For example, a first battery cell 120 can be disposed adjacent to a first outer wall 1135 and a second battery cell 120 can be disposed adjacent to a second outer wall 1140 such that the structural member 1125 can be disposed between the first battery cell 120 and the second battery cell 120. A plate 1150 can be disposed in the battery pack 1100. The plate 1150 can couple with the first battery cell 120, the second battery cell 120, and the structural member 1125 to couple the battery cells 120 with the structural member 125. For example, the plate 1150 can couple with a top of the battery cells 120 (or to a top of the respective battery cell groups 400) and to a top 1155 of the structural member 1125. The plate 1150 can cause the battery cells 120 to interface with or couple with the thermal components 215 that can be disposed between the battery cells 120 and the structural member 1125.

With reference to battery pack 1300, Act 1505 of disposing a battery cell 120 in a battery pack 1300 can include disposing the battery cell 120 in the bay 1305 of the battery pack 1300. Act 1505 can include disposing a plurality of battery cells 120 in the bay 1305. For example, a first battery cell 120 and a second battery cell 120 can be disposed in the bay 1305. The battery cells 120 can be a part of at least one battery cell group 400. For example, the battery cell group 400 can include a plurality of battery cells 120. The battery cell group 400 can arrange the plurality of battery cells 120 in various rows (e.g., rows A-H 605-640). The battery cell group 400 can define any number of rows of battery cells 120.

Act 1505 can include disposing a structural member in the bay 1305. For example, at least one of the vent member 1325, the base member 1355, and the cover member 1376 can be disposed in the bay 1305. The structural member can be disposed in the bay 1305 such that the structural member is parallel with at least one of the first bay wall 1310 or the second bay wall 1315. The structural member can extend in a longitudinal direction 1420 within the bay 1305. A plurality of structural members can be disposed in the bay 1105. For example, at least one of each of the vent member 1325, the base member 1355, and the cover member 1376 can be disposed in the bay 1305 or a plurality of at least one of the vent member 1325, the base member 1355, and the cover member 1376 can be disposed in the bay 1305.

For example, a vent member 1325 can be disposed in the bay 1305. A base member 1355 can be disposed in the bay 1305 and on top of the vent member 1325. An elevated portion 1340 of the vent member 1325 can interface with or couple with a base portion 1360 of the base member 1355. A cover member 1376 can be disposed in the bay 1305 and on top of the base member 1355. A first and second lower wall portion 1365 of the base portion 1360 can interface with or couple with a first and second corresponding upper wall portion 1380 of the cover member 1367. The based member 1355 and the cover member 1367 can define a cavity 1384. The battery cells 120 can be disposed in the cavity 1384.

Act 1505 can include disposing a thermal component 215 in the bay 1305. For example, a thermal component 215 can be disposed in the cavity 1384. The thermal component 215 can be disposed between the first battery cell 120 (or a first battery cell group 400) and the second battery cell 120 (or a second battery cell group 400).

Act 1510 of orienting the battery cell 120 can include orienting the battery cell 120 horizontally within the battery pack 1300. For example, a top portion 305 of the battery cell 120 can face the first bay wall 1310 and a bottom portion 310 of the battery cell 120 can face the second bay wall 1315. A central axis 340 of the battery cell 120 can extend in the axial direction 1415 in the battery pack 1300. For example, with the battery pack 1300 disposed in an electric vehicle 105, the central axis 340 can be parallel with a bottom surface 155 of the electric vehicle 105. A plurality of battery cells 120 can be oriented horizontally within the battery pack 100. For example, a top portion 305 of a first battery cell 120 can face the first bay wall 1310 and a top portion 305 of a second battery cell 120 can face the second bay wall 1315 such that the top portion 305 of the first battery cell 120 faces the top portion 305 of the second battery cell 120. A central axis 340 of the first battery cell 120 can be aligned with a central axis 340 of the second battery cell 120. The thermal component 215 can be disposed between the bottom portion 310 of the first battery cell 120 and the bottom portion 310 of the second battery cell 120. The thermal component 215 can be disposed between the bottom portion 310 of the first battery cell 120 and bottom portion 310 of the second battery cell 120.

Act 1510 can include coupling the structural member 1125 with one or more battery cells 120. For example, a battery cell group 400 comprising a plurality of battery cells 120 can be disposed in the cavity 1384 between the cover member 1376 and the base member 1355. The cover member 1376 can be coupled with the base member 1355 such that the battery cell group 400 is pinched between the cover member 1376 and the base member 1355. The top of the battery cell group 400 can interface with or couple with the top portion 1378 of the cover member 1376. A bottom of the battery cell group 400 can interface with or couple with the base portion 1360 of the base member 1355.

Some of the description herein emphasizes the structural independence of the aspects of the system components or groupings of operations and responsibilities of these system components. Other groupings that execute similar overall operations are within the scope of the present application. The systems described above can provide multiple of any or each of those components and these components can be provided on either a standalone system or on multiple instantiations in a distributed system.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, relative positions (e.g., above, below) are described with reference to the figures, but can be switched or changed based on perspective or orientation of the device or system. For example, first and second components (e.g., first member wall 1135 and second member wall 1140) can be interchangeable such that the first component can be referred to as the second component. For example, relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A battery pack, comprising:
   a bay having a first bay wall and a second bay wall;
   a first battery cell having a first portion and a second portion, the first portion of the first battery cell to face the first bay wall, and the second portion of the first battery cell to face the second bay wall; and
   a structural member disposed at least partially between the first portion of the first battery cell and a first portion of a second battery cell, the structural member defining a first channel to vent gases emitted by the first battery cell and a second channel to vent gases emitted by the second battery cell.

2. The battery pack of claim 1, comprising:
   the structural member oriented parallel with at least a portion of the first bay wall and at least a portion of the bay second wall;
   the first portion of the first battery cell disposed adjacent to the structural member.

3. The battery pack of claim 1, comprising:
   the first portion of the first battery cell comprising a battery terminal.

4. The battery pack of claim 1, comprising:
   the structural member that extends along the battery pack parallel with the first bay wall and the second bay wall;
   the first battery cell disposed adjacent to the structural member, the first portion of the first battery cell facing the structural member;
   a third battery cell comprising a fourth portion, the first battery cell disposed between the second third battery cell and the structural member and the fourth portion facing the structural member; and a thermal component disposed between the first battery cell and the third battery cell.

5. The battery pack of claim 1, comprising:
the structural member extends in a longitudinal direction within the bay of the battery pack, the structural member comprising:
a first outer wall;
a second outer wall disposed opposite the first outer wall; and
an inner wall disposed between the first outer wall and the second outer wall, the first outer wall and the inner wall defining the first channel, and the second outer wall and the inner wall defining the second channel, the first outer wall comprising a first opening defining a path for the gases from the first battery cell to enter the first channel, and the second outer wall comprising a second opening defining a path for gases from the second battery cell to enter the second channel.

6. The battery pack of claim 1, comprising:
the structural member disposed in the bay and extending parallel with at least one of the first bay wall and the second bay wall, the structural member comprising:
a first end;
a second end disposed opposite the first end; and
the first channel and the second channel that extend between the first end and the second end.

7. The battery pack of claim 1, comprising:
the structural member extending in a longitudinal direction within the bay of the battery pack;
a thermal component extending parallel with the structural member; and
a battery cell case to position the battery cell within the battery pack, the battery cell case to couple with the structural member.

8. A battery pack comprising:
a bay having a first bay wall and a second bay wall;
a battery cell having a first portion and a second portion, the first portion of the battery cell to face the first bay wall, and the second portion of the battery cell to face the second bay wall; and
a structural member disposed between the first bay wall and the second bay wall, the structural member defining a channel to vent gases emitted by the battery cell, the structural member comprising:
a first member defining a chamber;
a second member coupled with the first member, the second member and the first member defining a first cavity, wherein the chamber and the first cavity define the channel;
a third member coupled with the second member, the second member and the third member defining a second cavity;
the battery cell disposed in the second cavity;
the second member comprising a first opening extending between the first cavity and the second cavity and the first member comprising a second opening extending between the first cavity and the chamber to facilitate gas movement from the first cavity to the chamber.

9. The battery pack of claim 1, comprising:
the first battery cell comprising a first central axis;
the second battery cell comprising a second central axis;
a battery cell case comprising the first battery cell and the second battery cell, the first battery cell disposed in a first row of the battery cell case and the second battery cell disposed in a second row, the first row adjacent the second row, the first central axis being vertically offset from the second central axis.

10. The battery pack of claim 1, comprising:
a plurality of battery cells including the first battery cell and the second battery cell, the plurality of battery cells arranged in a plurality of rows, the plurality of rows are alternating such that a first subset of battery cells in a first set of rows are aligned, a second subset of battery cells in a second set of rows are aligned, and the first subset of battery cells are offset from the second subset of battery cells, each row from the first set of rows disposed between two adjacent rows from the second set of rows.

11. The battery pack of claim 1, comprising:
a plurality of battery cells including the first battery cell and the second battery cell, the plurality of battery cells comprising a first subset of battery cells arranged in a first row and a second subset of battery cells arranged in a second row, the first row disposed above the second row, each of the first subset of battery cells comprising a bottom side and each of the second subset of battery cells comprising a top side, the bottom side of each of the first subset of battery cells disposed below the top side of each of the first subset of battery cells.

12. The battery pack of claim 1, comprising:
a battery pack height; and
a plurality of battery cells including the first battery cell and the second battery cell, each of the plurality of battery cells having a battery cell width, the battery pack height based at least partially on the battery cell width of each of the plurality of battery cells.

13. The battery pack of claim 1, comprising:
a plurality of battery cells including the first battery cell and the second battery cell;
a battery cell case to position the plurality of battery cells within the battery pack, the battery cell case to arrange the plurality of battery cells in a plurality of rows, each of the plurality of rows is vertically offset from an adjacent row and vertically aligned with an alternating row.

14. An electric vehicle, comprising:
a battery pack, comprising:
a structural member disposed between a first bay wall and a second bay wall, the structural member extending along the battery pack parallel with at least a portion of the first bay wall and at least a portion of the second bay wall, the structural member defining a channel; and
a battery cell defining a central axis, the battery cell having a first portion and a second portion, the first portion of the battery cell disposed adjacent to the structural member, the channel configured to vent gases emitted by the battery cell; and
a chassis comprising a top chassis surface, the chassis to support the battery pack, the battery cell oriented horizontally such that the central axis is parallel with the top chassis surface.

15. The battery pack of claim 1, comprising:
the structural member, comprising:
a wall separating the battery cell from the channel; and
an opening in the wall, the opening to define a path for the gases from the battery cell to flow into the channel.

* * * * *